(12) United States Patent
Das et al.

(10) Patent No.: US 8,505,076 B2
(45) Date of Patent: Aug. 6, 2013

(54) PROACTIVE AUTHENTICATION

(75) Inventors: Subir Das, Belle Mead, NJ (US);
Yoshihiro Oba, Kawasaki (JP);
Ashutosh Dutta, Bridgewater, NJ (US)

(73) Assignees: Kabushiki Kaisha Toshiba, Tokyo (JP);
Telcordia Technologies, Inc.,
Piscataway, NJ (US)

( * ) Notice: Subject to any disclaimer, the term of this patent is extended or adjusted under 35 U.S.C. 154(b) by 300 days.

(21) Appl. No.: 12/772,632

(22) Filed: May 3, 2010

(65) Prior Publication Data

US 2010/0281519 A1 Nov. 4, 2010

Related U.S. Application Data

(60) Provisional application No. 61/175,016, filed on May 3, 2009, provisional application No. 61/221,551, filed on Jun. 29, 2009.

(51) Int. Cl.
*G06F 7/04* (2006.01)
*G06F 15/16* (2006.01)
*G06F 17/30* (2006.01)
*H04L 29/06* (2006.01)
*H04L 9/32* (2006.01)
*H04L 9/08* (2006.01)

(52) U.S. Cl.
USPC ............. 726/4; 726/5; 370/331; 713/168; 380/44; 380/278

(58) Field of Classification Search
USPC ............................................. 726/3
See application file for complete search history.

(56) References Cited

U.S. PATENT DOCUMENTS

| 7,114,175 | B2 |   | 9/2006  | Lahteenmaki |         |
|-----------|----|---|---------|-----------------------|---------|
| 7,496,364 | B2 | * | 2/2009  | Hoghooghi et al.      | 455/436 |
| 7,738,871 | B2 | * | 6/2010  | Olvera-Hernandez et al. | 455/436 |
| 7,813,319 | B2 | * | 10/2010 | Dutta et al.          | 370/331 |
| 8,005,224 | B2 | * | 8/2011  | Nakhjiri et al.       | 380/272 |
| 8,036,176 | B2 | * | 10/2011 | Oba et al.            | 370/331 |
| 8,098,627 | B2 | * | 1/2012  | Dutta et al.          | 370/331 |

(Continued)

OTHER PUBLICATIONS

Notification of Transmittal of the International Search Report and the Written Opinion of the International Searching Authority, or the Declaration (Form PCT/ISA/220) of International Application No. PCT/US2010/033415 mailed Jul. 9, 2010 with Forms PCT/ISA/210 and PCT/ISA/237.

(Continued)

*Primary Examiner* — Carolyn B Kosowski
(74) *Attorney, Agent, or Firm* — Westerman, Hattori, Daniels & Adrian, LLP

(57) ABSTRACT

A system for proactively authenticating includes a server having media independent access functions including media independent authentication functions that authenticates other entities attached via an interface to an end of a link specific to a media. A plurality of heterogeneous networks each having media specific access functions including authentication functions corresponding to the other entities attached via the interface to the end of the link specific to the media and mobile devices connected to the plurality of heterogeneous networks, and the server having predefined media independent handover protocols and media independent handover identities based on the media independent functions related to handover, in which the server authenticates candidate access networks prior to the handover of the mobile devices from serving access networks to the candidate access networks each of which belonging to the plurality of heterogeneous access networks having the link specific to the media.

20 Claims, 14 Drawing Sheets

U.S. PATENT DOCUMENTS

| | | | |
|---|---|---|---|
| 8,145,195 B2 * | 3/2012 | Forsberg et al. | 455/411 |
| 8,228,861 B1 * | 7/2012 | Nix | 370/329 |
| 8,305,980 B1 * | 11/2012 | Nix | 370/329 |
| 8,341,395 B2 * | 12/2012 | Das et al. | 713/151 |
| 2006/0140150 A1 * | 6/2006 | Olvera-Hernandez et al. | 370/331 |
| 2006/0221899 A1 * | 10/2006 | Feder et al. | 370/331 |
| 2006/0285519 A1 * | 12/2006 | Narayanan et al. | 370/331 |
| 2007/0008926 A1 * | 1/2007 | Oba | 370/331 |
| 2007/0047491 A1 | 3/2007 | Dutta et al. | |
| 2007/0101406 A1 | 5/2007 | Zavalkovsky et al. | |
| 2007/0189218 A1 * | 8/2007 | Oba et al. | 370/331 |
| 2008/0069050 A1 * | 3/2008 | Dutta et al. | 370/331 |
| 2008/0095114 A1 * | 4/2008 | Dutta et al. | 370/331 |
| 2008/0141031 A1 * | 6/2008 | Oba et al. | 713/170 |
| 2008/0212783 A1 | 9/2008 | Oba | |
| 2008/0291876 A1 | 11/2008 | Mukherjee et al. | |
| 2008/0310366 A1 * | 12/2008 | Oba et al. | 370/331 |
| 2009/0067623 A1 | 3/2009 | Lei et al. | |
| 2009/0257400 A1 * | 10/2009 | Perras | 370/331 |
| 2010/0091733 A1 * | 4/2010 | Hahn et al. | 370/331 |
| 2010/0142478 A1 * | 6/2010 | Forssell et al. | 370/331 |
| 2010/0246532 A1 * | 9/2010 | Olvera-Hernandez et al. | 370/331 |
| 2010/0281249 A1 * | 11/2010 | Das et al. | 713/151 |
| 2010/0281519 A1 * | 11/2010 | Das et al. | 726/3 |
| 2012/0020329 A1 * | 1/2012 | Lee et al. | 370/331 |
| 2012/0082136 A1 * | 4/2012 | Dutta et al. | 370/331 |

OTHER PUBLICATIONS

Notification of Transmittal of the International Search Report and Written Opinion of the International Searching Authority, or the Declaration (PCT/ISA/220) of International Application No. PCT/US10/33404 mailed Feb. 3, 2012, with Forms PCT/ISA/210 and PCT/ISA/237.

* cited by examiner

PROACTIVE AUTHENTICATION

CROSS-REFERENCE TO RELATED APPLICATION

This application claims the benefit of U.S. Provisional Applications No. 61/175,016, filed May 3, 2009 and 61/221,551, filed Jun. 29, 2009, the entire disclosures of which are incorporated herein by reference.

BACKGROUND

1. Field

This invention relates to the security signaling between heterogeneous networks and more particularly, to a concept of authentication and authorization to perform a secure handover between a mobile node (MN) and a target network.

2. Description of Related Art

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media Independent Handover Services:

In I.E.E.E. P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems.

The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.)." See 1.1 of I.E.E.E. P802.21/D.01.09, September 2006, entitled Draft IEEE Standard for Local and Metropolitan Area Networks: Media Independent Handover Services, the entire contents of which document is incorporated herein into and as part of this patent application. In addition, the provisional application from which priority is claimed herein also incorporated Draft 05 (Referred to herein as D05) of said standard and I.E.E.E. standard 802.21 published on Jan. 21, 2009, the entire contents of which is again incorporated herein by reference—i.e., see, e.g., I.E.E.E. P802.21/D05.00, April, 2007, Draft Standard for Local and Metropolitan Area Networks: Media Independent Handover Services, Sponsored by the LAN MAN Standards Committee of the I.E.E.E. Computer Society and I.E.E.E. standard for Local and Metropolitan Area Networks—Part 21: Media Independent Handover Services published on Jan. 21, 2009, Sponsored by the LAN MAN Standards Committee of the I.E.E.E. Computer Society respectively.

General Architecture:

Introduction:

The IEEE 802.21 standard is intended to facilitate a variety of handover methods. Such methods are generally classified as 'hard' or 'soft', depending on whether the handover procedure is "break before make" or "make before break" with respect to the data transport facilities that support the exchange of data packets between the mobile node and the network.

In general, handover involves cooperative use of both mobile node and network infrastructure in order to satisfy network operator and end user needs. Handover control, handover policies and other algorithms involved in handover decision making are generally handled by communication system elements which do not fall within the scope of the IEEE 802.21 standard. However, it is beneficial to describe certain aspects of the overall handover procedure so that the role and purpose of MIH Event Service, MIH Command Service, MIH Information Service and MIHF in overall handover process is clear.

General Design Principles:

The IEEE 802.21 standard is based on the following general design principles.

a) MIH Function is logical entity that helps and facilitates handover decision-making. Upper layers make handover decisions and link selection based on inputs and context from MIHF. Facilitating the recognition that a handover should take place is one of the key goals of MIHF. Discovery of information on how to make effective handover decisions is also a key component.

b) MIHF provides abstracted services to higher layers. From that perspective MIHF offers a unified interface to the upper layers. The service primitives exposed by this unified interface are based on the technology specific protocol entities of the different access networks. The MIHF communicates with the lower layers of the mobility-management protocol stack through technology-specific interfaces.

The specification of the MIHF interfaces with the lower layers generally does not fall within the scope of this standard. Such interfaces may already be specified as service access points (SAPs) within the standards that pertain to the respective access technologies, such as IEEE 802.1, IEEE 802.3, IEEE 802.11, IEEE 802.16, 3GPP and 3GPP2. This standard may contain recommendations to amend the existing access technology specific standards when modifications of the lower-layer interfaces may enable or enhance MIHF functionality.

c) Handover signaling (as part of handover execution and subsequent updates) may not be part of the standard. Different access networks support horizontal handover mechanisms (mobile initiated, network initiated, etc.). Handover initiation trigger may be useful in heterogeneous handovers when not done as per the homogeneous scheme.

d) MIHF may do further processing on MAC/PHY triggers and other related local events. Definition of this processing is outside the scope of the standard. The standard shall provide support for remote events as well. Events are advisory in nature. The decision whether to cause a handover or not based on these events is outside the scope of the standard.

e) The standard shall specify mechanisms to support MN-initiated, MN-controlled, network-initiated and network-controlled handovers.

f) The standard may support transparent inter-working with legacy equipment. Thus IEEE 802.21 compatible equipment should be able to co-exist with legacy non IEEE 802.21 compliant equipment.

Media Independent Handover Reference Framework:

The following sections describe aspects with regards to communication between different MIHF entities in the client device (MN) and the network.

MIHF functions communicate with each other for various purposes. The client device (mobile node) exchanges MIH information with its MIH Point of Service. The MIHF in any Network Entity becomes an MIH PoS when it communicates directly with a MN based MIHF. An MIH Network Entity may not have a direct connection to the MN and therefore does not constitute an MIH PoS for that particular MN. The same MIH Network Entity may still act as MIH PoS for a different MN. MIHF communication may not take place on all L2 interfaces of an MIH capable MN. As an example, on an MIH capable MN with three L2 interfaces namely 802.11, 802.16, and 802.3, the 802.3 interface may be used only for system administration and maintenance operations, while the 802.11 and 802.16 interfaces may engage in the provision of MIHF services. The MN may use L2 transport for exchanging MIH information with an MIH PoS that resides in the same Network Entity as its Network PoA. The MN may use L3 transport for exchanging MIH information with an MIH PoS that may not reside in the same Network Entity as its Network PoA. The framework supports use of either L2 or L3 mechanisms toward communication among MIH network entities.

FIG. 3 shows an MIH communication model from the 802.21 standard. The model shows MIHFs in different distinctive roles and the communication relationships amongst them. The communication relationship shown in FIG. 3 applies only to MIHFs. It is noteworthy that each of the communication relationships in the communication model does not imply a particular transport mechanism. Rather, a communication relationship only intends to show that MIHF related information passing is possible between the two distinctive MIHFs. Moreover, 1) MIHF on the MN, 2) MIH PoS on the Network Entity that includes the serving PoA of the MN, 3) MIH PoS on the Network Entity that includes a candidate PoA for the MN (a candidate PoA is a PoA that the MN is aware of but not currently attached to; it becomes the target PoA if a handover eventually occurs), 4) MIH PoS on a Network Entity that does not include a PoA for the MN, 5) MIH non-PoS on a Network Entity that does not include a PoA for the MN.

The communication model also identifies the following communication reference points between different instances of MIHFs.

1) Communication reference point R1: Reference Point R1 refers to MIHF procedures between the MIHF on the MN and the MIH PoS on the Network Entity of its serving PoA. R1 may encompass communication interfaces over both L2 and L3 and above. MIHF content passed over R1 may be related to MIIS, MIES, or MICS.

2) Communication reference point R2: Reference Point R2 refers to MIHF procedures between the MIHF on the MN and the MIH PoS on the Network Entity of a candidate PoA. R2 may encompass communication interfaces over both L2 and L3 and above. MIHF content passed over R2 may be related to MIIS, MIES, or MICS.

3) Communication reference point R3: Reference Point R3 refers to MIHF procedures between the MIHF on the MN and the MIH PoS on a non-PoA Network Entity. R3 may encompass communication interfaces over L3 and above and possibly L2 transport protocol like Ethernet bridging, MPLS, etc. MIHF content passed over R3 may be related to MIIS, MIES, or MICS.

4) Communication reference point R4: Reference Point R4 refers to MIHF procedures between an MIH PoS in a Network Entity and an MIH non-PoS instance in another Network Entity. R4 may encompass communication interfaces over L3 and above. MIHF content passed over R4 may be related to MIIS, MIES, or MICS.

5) Communication reference point R5: Reference Point R5 refers to MIHF procedures between two MIH PoS instances in distinct Network Entities. R5 may encompass communication interfaces over L3 and above. MIHF content passed over R5 may be related to MIIS, MIES, or MICS.

Illustration of the MIH Communication Model:

A network model including MIH services is shown in FIG. 4 for greater illustration of the MIH Communication Reference Points. Moving from right to left, the model includes an MIH-capable mobile node (MN, far right) that supports multiple wired and wireless access technology options. The model assumes that the provisioning service provider either operates multiple access technologies or allows its user to roam into other networks when SLA in support of interworking has been established. The MN has an MIHF implemented, which enables it to send specific MIH queries. The MN may have the information service partially implemented internally.

The model illustrates access networks that are connected in some loose, serial way to a core network (Operator 1-3 Core). Also depicted is an access network that is more tightly interworked or coupled (Access Network-3) The Operator 1-3 Core each might represent a service provider, corporate intranet provider or just another part of the visited or home access, or even core network. In this model the provisioning provider is operating Access Network-3 coupled via R1 to a core (labeled Visited/Home Core Network). The terms Visited and Home are used to indicate the provisioning service provider or enterprise. Any of the illustrated networks could be both a visited or home network depending on the relation of the operator to the provisioner of the MN. Network providers offer MIH services in their access networks (Access Network-1 to 4) to facilitate handover into their networks. Each access technology either advertises its MIH capability or responds to MIH service discovery. Each service provider for the access network allows access to one or more MIH Points of Service (PoS, compare with Communication Model) These PoS may provide some or all of the MIH services as determined during MIH capabilities discovery. The location or node of an MIH PoS is not fixed by the standard. The PoS location may vary based on operator deployment scenario and the technology-specific MIH architecture.

An MIH PoS may reside next to or be co-located with the point of attachment (PoA) in the access network Access Network 1,2,4 are typical). Alternatively the PoS may reside deeper inside the access or core networks (Access Network 3 is typical). As shown in FIG. 3, the MIH entity in the MN communicates with MIH network entities either by R1, R2 or R3 over any access network. When the PoA in the serving access network has a co-located MIH function, then an R1 reference connection terminates at the PoA which is also the PoS (MN to Access Network 1,2,4 of the model could all be R1) In that case an R3 reference connection would be terminated at any non-PoA (also illustrated by MN to Access Networks 1,2,4). MIH events may originate at both sides of an active R1 link. The MN is typically the first node to react to these events.

The interaction of visited and home network could be either for control and management purposes or for data transport purposes. It is also possible that due to roaming or SLA agreements, the home network may allow the MN to access the public Internet directly through a visited network. As illustrated, two MIH network entities may communicate with each other via R4 or R5 reference connections. The MIH capable PoA may also communicate with other MIH network entities via R3 and R4 reference points. The MIH capable MN could have a MIH communication with other PoA in the candidate access networks via R2 reference point to obtain information services about the candidate network.

With regard to the MIH Information Service (MIIS) the providers offer access to their information server located in a MIH PoS node (upper far left). The operator provides the MIIS to mobile nodes so they can obtain pertinent information including but not limited to new roaming lists, costs, provider identification information, provider services, priorities and any other information that would enable to select and utilize services. As illustrated, it is possible for the mobile node to be pre-provisioned with MIIS data by its provider.

Also possible is for the mobile node to obtain MIH information services from any access network of its provider. MIIS could also be available from another overlapping or nearby network, using that network's MIIS point of service. A provisioner's network (depicted here as coupled with Access Network 3) may utilize R3 and R4 interfaces to access other MIH entities like the provisioner's or visited network's MIH information server.

With regard to the MIH Command Service (MICS), any of the Information Database may be also used as command service PoS. The MN MIHF typically communicates with this server using a layer three transport.

MIHF Services:

The MIHF provides asynchronous and synchronous services through well defined SAPs for link layers and MIH users. In the case of a system with multiple network interfaces of arbitrary type, the upper layers may use the Event service, Command service and Information service provided by MIH to manage, determine, and control the state of the underlying interfaces.

These services provided by MIH help the upper layers in maintaining service continuity, service adaptation to varying quality of service, battery life conservation, and network discovery and link selection. In a system containing heterogeneous network interfaces of 802 types and cellular 3GPP, 3GPP2 types, the Media Independent Handover Function may help the upper layers to implement effective procedures to couple services across heterogeneous network interfaces. Upper layers may utilize services provided by the MIHF across different entities to query resources required for a handover operation between heterogeneous networks.

MIH services in mobile devices facilitate seamless handover between heterogeneous networks. An MIH user such as a mobility management protocol (example Mobile IP) could be supported for handover and seamless session continuity. This shall not preclude other protocols in addition to Mobile IP and even other upper layers from making use of MIH services to optimize handovers.

Mobile nodes employing MIH services would receive indications from link layers for asynchronous operations like Event service. The interaction with Command service and Information service will be through synchronous query and response type of mechanisms.

The MIHF would also provide the functionality for the exchange of information between the network and host entities of the same media type. Note, if mechanism for such information exchange already exists with a given type of media (such as with some cellular media types), the MIHF will make use of the existing mechanism whenever possible.

MIH Protocol:

The IEEE 802.21 standard supports the Media Independent Event service, Media Independent Command service and Media Independent Information service. The MIH Protocol defines the format of the messages (i.e. MIHF packet with header and payload) that are exchanged between remote MIHF entities and the transport mechanisms that support the delivery of the messages. The selection of the transport mechanism is dependent on the access technology that connects the MN to the network and the location of the MIH PoS.

The packet payload for these services may be carried over L2 management frames, L2 data frames or other higher layer protocols. Wireless networks such as 802.11 and 802.16 have a management plane and support management frames which could be suitably enhanced for carrying the above payloads. However, the wired Ethernet network does not have management plane and may carry the above payloads only in data frames.

The IEEE 802.21 standard defines the packet format and payloads in media independent manner in standard TLV format. Thereafter, these packets may be encapsulated in a L2 MIH Protocol using MIHF ethertype when the payload needs to be sent over normal data frames as in case of Ethernet. In other cases the TLV based messages and payload may be directly encapsulated in media specific management frames. Alternatively, MIH protocol messages may be encapsulated using a lower layer (L2) or a higher layer (L3 and above) transport.

The IEEE 802.21 standard defines the format of MIH Protocol data unit (PDU) header and payload. Standard TLV format provides media-independent representation for the PDU payload contents. The MIHF PDUs are encapsulated in data frames with MIHF ethertype over 802 links. For 802.11 and 802.16 links extensions of media-specific management frames are recommended for carrying MIH messages. No assumptions are made in this standard regarding the transport of MIH messages over 3GPP and 3GPP2 access links at L2.

Media Independent Information Service:

Introduction:

Media Independent Information Service (MIIS) provides a framework by which an MIHF both in the mobile node and in the network may discover and obtain network information within a geographical area to facilitate handovers. The objective is to acquire a global view of all the heterogeneous networks relevant to the MN in the area to facilitate seamless handovers when roaming across these networks.

Media Independent Information Service includes support for various Information Elements (IEs). Information Elements provide information that is essential for a network selector to make intelligent handover decision.

Depending on the type of mobility, support for different types of information elements may be necessary for performing handovers. For example in case of horizontal handovers across different PoAs of the same access network, information available from lower link layers of access network may be sufficient. In such cases information elements like intra-technology neighbor reports and other link layer information required during handovers is directly available from the access network. In such cases the availability of higher layer services offered by the network may not change appreciably across different network point of attachment.

On the other hand, during vertical handovers there is a need to select appropriate PoA in the new network based on both optimum link layer connectivity as well as availability of appropriate higher layer services to permit service and session continuity for active user applications.

Media Independent Information Service (MIIS) provides the capability for obtaining the necessary information for handovers. This includes information about lower layers such as neighbor maps and other link layer parameters as well as information about available higher layer services such as internet connectivity, availability of VPN services, etc. The set of different higher layer services provided by the MIIS may constantly evolve. At the same time the list of access networks that are supported by MIIS may also evolve. As such, there is a need for flexibility and extensibility in the way the MIIS provides support for different information elements. Towards this end the MIIS defines a schema. The schema helps a client of MIIS to discover the capabilities of MIIS and also discover the entire set of different access networks and IEs supported by a particular implementation. Schema representation also allows the mobile node to query the information in a more flexible and efficient manner. As part of defining this schema the MIIS may also identify a set of basic information elements that may define the core functionality of different implementations of MIIS. Other information elements as they are added may become part of the extended set of MIIS capabilities.

MIIS provides information about different access networks such as 802 networks, 3GPP networks and 3GPP2 networks. The MIIS also allows this collective information to be accessed from any single network.

Thus for example using an 802.11 access network, it may be possible to get information not only about all other 802 networks in a particular region but also that of 3GPP and 3GPP2 networks as well. Similarly using a 3GPP2 interface, it may be possible to get access to information about all 802 and 3GPP networks in a given region. This capability allows the mobile node to use its currently active access network and scan for other available access networks in a geographical region. Thus, a mobile node is freed from the burden of powering up each of its individual radios and establishing network connectivity for the purpose of accessing heterogeneous network information. MIIS enables this functionality across all available access networks by providing uniform way to retrieve heterogeneous network information in any geographical area.

Information Service Elements:

The main goal behind the Information service is to allow mobile node and network entities to discover information that may influence the selection of appropriate networks during handovers. This information is intended to be primarily used by a policy engine entity that may make effective handover decisions based on this information. This information service is expected to provide mostly static type of information, although network configuration changes must also be accounted for. Other dynamic information about different access networks such as current available resource levels, state parameters, dynamic statistics etc. should be obtained directly from the respective access networks. Some of the key motivations behind the Information Service are as follows:

1) Provide information about the availability of access networks in a geographical area. Further, this information could be retrieved using any wireless network, for example, information about a nearby WiFi hotspot could be obtained using a GSM, CDMA, or any other cellular network, whether by means of request/response signaling, or information that is specifically or implicitly broadcast over those cellular networks. Alternatively, this information could be maintained in an internal database by the MN.

2) Provide static link layer information parameters that could help the mobile devices in selecting the appropriate access network. For example knowledge of whether security and QoS are supported on a particular access network may influence the decision to select such an access network during handovers.

3) The link layer information comprising of neighbor reports and information about capabilities of different PoAs could also aid in configuring the radios optimally (to the extent possible) for connecting to available/selected access networks. For example knowing about supported channels by different PoAs may help in configuring the channels optimally as opposed to scanning, beaconing etc. and then finding out this information. However, for most part, dynamic link layer parameters have to be obtained or selected based on direct interaction with the access networks and the Information Service may not be able to help much in that regard.

4) Provide an indication of higher layer services supported by different access networks and other relevant information that may aid in making handover decisions. Such information may not be available (or could not be made available) directly from MAC/PHY layers of specific access networks, but could be provided as part of the Information service. For example, in certain cases classification of different networks into categories such as public, enterprise, home, others, etc. may influence handover decision. Other information here may be more vendor/network specific in nature and could be specified in that form.

The information service elements are classified into three groups:

1) General Access Network Information: These information elements give a general overview of the different networks providing coverage within an area such as list of available networks and their associated operators, roaming agreements between different operators, cost of connecting to the network and network security and quality of service capabilities.

2) Information about Points of Attachment: These information elements provide information about different PoAs for each of the available access networks. These IEs include PoA addressing information, PoA location, data rates supported, the type of PHY and MAC layers and any channel parameters to optimize link layer connectivity. This may also include higher layer services and individual capabilities of different PoAs.

3) Other Information may be vendor/network specific, and could be specified appropriately.

Media Independent Handover Protocol:

Introduction:

The MIHF provides asynchronous and synchronous services through well defined SAPs for lower layers and upper layers. The services provided include the Event Service (ES), Command Service (CS), and Information Service (IS). Detailed description about MIH services are found in the 802.21 draft document. MIH SAPs include the MIH upper layer SAP, which is used by the users of MIH to gain access to various MIHF services, and MIH lower layer SAPs, which are used by MIHF to gain access and control of a variety of media dependent lower layer resources.

The MIH protocol defines frame formats for exchanging messages between peer MIHF entities. These messages are based on the primitives which are part of Media Independent Event service, Media Independent Command service and Media Independent Information service. IEEE 802.21 supports Media Independent Handover Function in mobile node, and network. The MIH Protocol allows peer MIHF entities to interact with each other.

In order for mobile node's MIHF entity to commence MIH protocol procedures, MIHF entity of mobile node may discover its peer remote MIHF entities. Peer remote MIHF entity is the correspondent MIHF entity with which MIHF of mobile node exchanges MIH protocol messages. Because peer remote MIHF entities reside in anywhere of the network, MIHF entity of mobile node may discover MIHF entity in the network before initiating MIH protocol procedure. This is done through the MIH Function Discovery procedure.

MIH Function Discovery can be done either at Layer 2 or Layer 3. However, this document only specifies how MIH Function Discovery is performed at Layer 2, when both MIH Functions are located within the same broadcast domain. MIH Function Discovery may be performed either through the MIH protocol (i.e. using L2 encapsulation such as LLC) or through media specific Layer 2 broadcast messages (i.e. 802.11 beacons, 802.16 DCD). MIH Function Discovery at Layer 3 is outside of scope of 802.21.

Once the peer MIHF has been discovered, the MN may discover the capabilities of the peer MIHF. This is done through the MIH Capability Discovery procedure. MIH Capability Discovery may be performed either through the MIH protocol or through media specific Layer 2 broadcast messages (i.e. 802.11 beacons, 802.16 DCD).

When the peer MIHF resides within the same broadcast domain as the MN, MIH Function Discovery can be performed using only MIH Capability Discovery.

Illustrative Architecture:

FIG. 1 depicts some illustrative architectural components that can be employed in some illustrative and non-limiting implementations including wireless access points to which client devices communicate. In this regard, FIG. 1 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 2 shows an illustrative computer or control unit that can be used to implement computerized process steps, to be carried out by devices, such as, e.g., an access point, an authenticator, a user station, a source node or destination node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

General Background References:

To facilitate reference, the following general background applications are made of reference (such applications also incorporates herein by reference the entire disclosures of all of the following patent applications for background reference):

1) U.S. Provisional Application No. 60/891,349, filed Feb. 23, 2007, to K. Taniuchi, et al.;
2) U.S. Provisional Application No. 60/825,567, filed Sep. 13, 2006 to Y. A. Cheng, et al.;
3) U.S. application Ser. No. 11/567,134, filed Dec. 5, 2006, to Y. Oba, et al.;
4) U.S. application Ser. No. 11/563,000, filed Nov. 23, 2006, to Y. Oba, et al.;
5) U.S. application Ser. No. 11/558,922, filed Nov. 12, 2006, to Y. Oba, et al.;
6) U.S. application Ser. No. 11/460,616, filed Jul. 27, 2006, to Y. Oba, et al.;
7) U.S. application Ser. No. 11/279,856, filed Apr. 14, 2006, to A. Dutta, et al., entitled Framework Of Media-Independent Pre-Authentication Improvements:
8) Including Considerations For Failed Switching And Switchback;
9) U.S. application Ser. No. 11/308,175, filed Mar. 9, 2006, to Y. Oba, et al., Framework of Media Independent Pre-Authentication Support for PANA;
10) U.S. application Ser. No. 11/307,362, filed February 2006, to A. Dutta, et al., entitled A Framework of Media-Independent Pre-authentication;
11) U.S. application Ser. No. 12/119,048, filed May 12, 2008, to Y. Oba, et al.

As noted above, the media independent solution for handovers does not address the security signaling requirement between heterogeneous networks. To perform a secure handover by mobile nodes (MN) attached between heterogeneous media supported networks, the authentication, authorization and confidentiality between a mobile node and the candidate network (target network) is required. However, the addition of security-related signaling can add significant delays to handover efforts which can affect time sensitive applications such as Voice over Internet Protocol (VoIP) for delivery of voice communications over IP networks such as the Internet or other packet-switched networks. In many cases, service continuity can no longer be met because of the impact on quality of service (QOS), which ultimately impacts the user experience, too great.

SUMMARY

In some exemplary embodiments, the problem of adverse impact on quality of service and the user experience due to the addition of security-related signaling over the media independent handover protocols is solved by proactive authentication techniques and MIH protocol level security mechanisms, among other things, by optimizing the security-related signaling during handovers.

In one aspect of this application, a system for proactively authenticating includes a server having media independent access functions including media independent authentication functions that authenticates other entities attached via an interface to an end of a link specific to a media. A plurality of heterogeneous networks each having media specific access functions including authentication functions corresponding to the other entities attached via the interface to the end of the link specific to the media and mobile devices connected to the plurality of heterogeneous networks, and the server having predefined media independent handover protocols and media independent handover identities based on the media independent functions related to handover, in which the server authenticates candidate access networks prior to the handover of the mobile devices from serving access networks to the candidate access networks each of which belonging to the plurality of heterogeneous access networks having the link specific to the media.

In another aspect of this application, an article of manufacture includes a machine-accessible medium having instructions encoded thereon for enabling a processor to execute an operation for proactively authenticating mobile devices attached between heterogeneous media via media independent authenticator, comprising the steps of: assigning media specific authentication procedures to mobile devices attached to a serving access network within a plurality of heterogeneous access networks; providing information regarding candidate access networks by way of the media independent authenticator to mobile devices during a handover preparation stage; performing a proactive authentication using a interface; and executing, upon successfully performing the proactive authentication by way of the media independent authenticator, the handover to a candidate access network having the media specific authentication procedure.

In yet another aspect of this application, an apparatus having computer implemented media independent access functions includes an independent authenticator, the independent authenticator to authenticate mobile devices attached between heterogeneous media; an interface to connect the independent authenticator to a plurality of heterogeneous access networks each of which supports a specific authenticator that corresponds to a specific serving media; and predefined media independent handover protocols and media independent handover identities based on the media independent functions on the computer, wherein the independent authenticator authenticates candidate access networks prior to the handover of the mobile devices from serving access networks to the candidate access networks each of which belonging to the plurality of heterogeneous access networks having the specific serving media, wherein media specific keys are pulled or pushed from the specific authenticator of a serving access network and a candidate access network via a specific interface provided between the independent authenticator and the specific authenticator, in which the independent authenticator to hold master authentication keys to derive media independent pair-wise master authentication keys for handover, wherein the candidate access network and the mobile devices generate a point of attachment link address list and a mobile node link address list in a final request and response, respectively so as to securely bind the media specific keys with link layer identities, wherein each of the plurality of heterogeneous access networks is connected to a dedicated independent authenticator via the interface; and a separate interface to form a bilateral communication connection between the dedicated independent authenticator of each of the plurality of heterogeneous access networks, wherein each of the plurality of heterogeneous access networks with the dedicated independent authenticator having two separate point of services, wherein the independent authenticator being a single point of service for managing bilateral communication among each of the plurality of heterogeneous access networks via the interface, wherein the mobile devices perform authentication with the independent authenticator of a corresponding candidate access network by going through a serving access network, to which the mobile devices are attached, prior to handover of the mobile devices to the corresponding candidate access network, wherein a trigger for the handover can be generated by the candidate access network or by the mobile devices, wherein the mobile devices directly perform authentication with the independent authenticator of a corresponding candidate access network prior to handover of the mobile devices to the corresponding candidate access network, wherein a trigger for the handover can be generated by the candidate access network followed by the response from the mobile devices or by the mobile devices followed by the response from the candidate network, wherein the serving media comprises cable, fiber, radio frequency and satellite.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and other features and advantages of embodiments of the present invention will become more apparent by describing in detail exemplary embodiments thereof with reference to the attached drawings in which.

DETAILED DESCRIPTION

Figure 1:
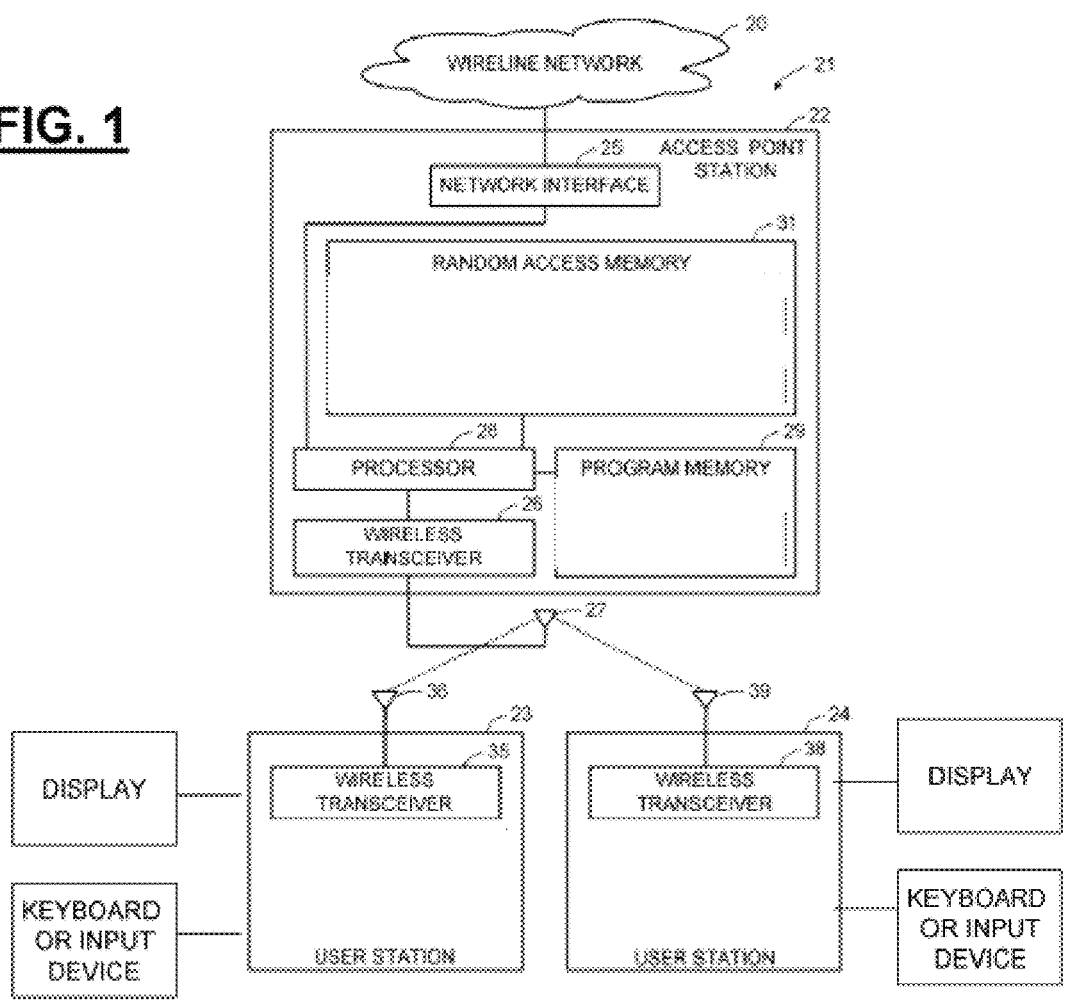
FIG. 1 depicts some illustrative architectural components that can be employed in some illustrative and non-limiting implementations including wireless access points to which client devices communicate.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Terminologies:
  EAP: Extensible Authentication Protocol
  ERP: EAP Re-Authentication Protocol
  SA: Serving Authenticator
  CA: Candidate Authenticator Definitions
  Authentication Process: The cryptographic operations and supporting data frames that perform the authentication.
  Media Specific Authenticator and Key Holder (MSA-KH): Media specific authenticator and key holder is an entity that facilitates authentication of other entities attached to the other end of a link specific to a media.
  Media Independent Authenticator and Key Holder (MIA-KH): Media Independent authenticator and key holder is an entity that interacts with MSA-KH and facilitates proactive authentication of other entities attached to the other end of a link of a MSA-KH.
  Proactive Authentication: An authentication process that is performed between MIA-KH and other entities attached to the other end of a link of a MSA-KH. This process occurs when the other entities intend to perform a handover to another link.
  Serving MIA-KH: The MIA KH that is currently serving to a mobile node which is attached to an access network
  Candidate MIA-KH: The MIA-KH that is serving to an access network which is in the mobile node's list of potential candidate access networks.
  MIH Security Association (SA): An MIH SA is the security association between the peer MIH entities References
  Each and every of the following references are incorporated herein by reference in this disclosure in their entireties for background reference:

[RFC4748] H. Levkowetz, Ed. and et al, Extensible Authentication Protocol (EAP), RFC 3748;

[RFC5296] V. Narayan and L. Dondeti, "EAP Extensions for EAP Re-authentication Protocol (ERP)" RFC 5296;

[RFC4306] C. Kaufman, Ed, "Internet Key Exchange (IKEv2) Protocol:", RFC 4306;

[RFC5246] T. Dierks and E. Rescorla, "The Transport Layer Security (TLS) Protocol Version 1.2", RFC 5246;

[RFC4347] E. Rescorla and N. Modadugu, "Datagram Transport Layer Security", RFC 4347;

[RFC5295] J. Saloway, et al, "Specification for the Derivation of Root Keys from an Extended Master Session Key (EMSK)" RFC 5295; and

[IEEE802.21] IEEE P802.21 Std-2008, IEEE Standard for Local and Metropolitan Area Networks—Part 21: Media Independent Handover Services.

Proactive Authentication

Proactive authentication is a process by which an entity can perform a priori network access authentication with a media independent authenticator and key holder (MIA-KH) that is serving a candidate network. The entity performs such authentication in anticipation of handover to the neighboring networks. Proactive authentication can be performed in two ways: i) Direct Proactive Authentication (FIG. 5) whereby the authentication signaling is transparent to the serving MIA-KH and ii) Indirect Proactive Authentication (FIG. 6) whereby the serving MIA-KH is aware of the authentication signaling. In each case either EAP (Extensible Authentication Protocol) [RFC4798] or ERP (EAP Re-Authentication Protocol) [RFC5296] can be used as authentication protocol.

Figure 5:
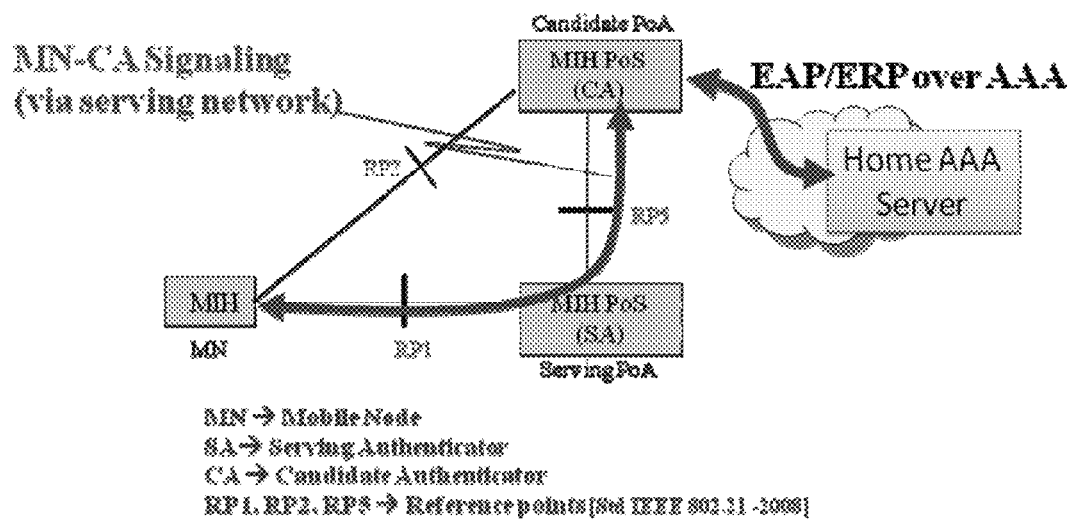
FIG. 5 illustrates the relationship between different functional entities and their involvement during direct proactive authentication signaling.
Figure 6:
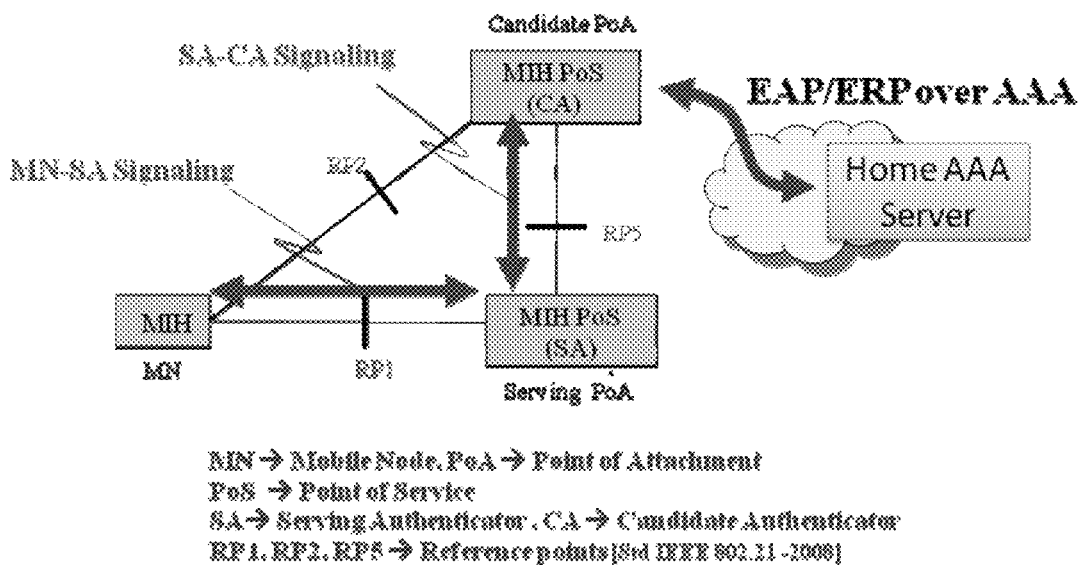
FIG. 6 illustrates the relationship between different functional entities and their involvement during indirect proactive authentication signaling.

FIG. 5 and FIG. 6 illustrate the relationship between different functional entities and their involvement during proactive authentication signaling. For direct proactive authentication, mobile node directly communicates with the candidate MIA-KH (FIG. 5) and for indirect proactive authentication, mobile node first communicates with the serving MIA-KH. Serving MIA-KH then communicates with the candidate MIA KH on behalf of mobile node.

Proactive Authentication Architecture

Figure 7:
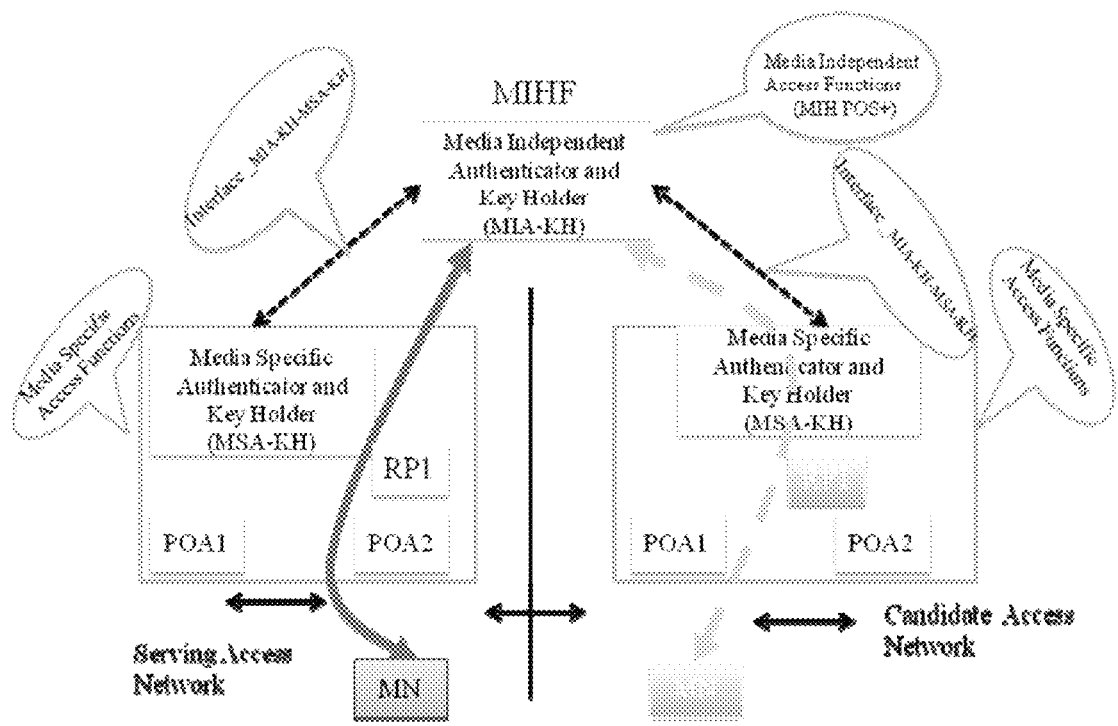
FIG. 7 illustrates an illustrative logical architecture for proactive authentication where two access networks are managed by one media independent authenticator and key holder.
Figure 8:
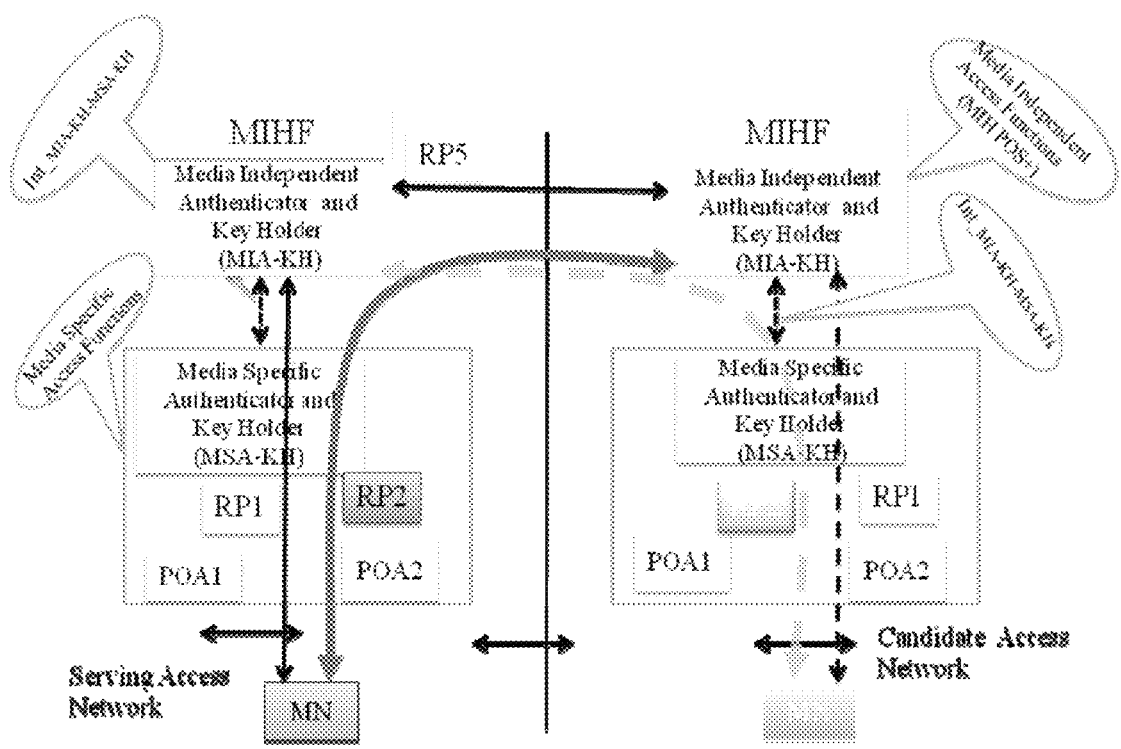
FIG. 8 illustrates an illustrative logical architecture for proactive authentication where two access networks are managed by two separate media independent authenticator and key holders.

The exemplary embodiments in FIG. 7 and FIG. 8 depict two example logical architectures for proactive authentication. The Media Independent Authenticator and Key Holder (MIA-KH) is the entity that facilities the authentication prior to handover to candidate networks. In this architecture, the authentication functionalities are added within Media Independent Handover Function (MIHF) and the new entity is called as enhanced POS (e.g., PoS+).

The Media Specific Authenticator and key holder (MSA-KH) is responsible for authenticating devices for access to a specific access network and the proposed architecture assumes no change of such existing mechanisms. The difference between FIG. 7 and FIG. 8 is that in FIG. 7, two access networks are managed by one MIA-KH and hence there exists one PoS while in FIG. 8, each access network has their own MIA-KH and hence two separate PoSes are required. FIG. 8 also has one additional interface called RP5 per MIH communication model [IEEE Std 802.21.2008).

This disclosure supports both direct and indirect proactive authentication including network-initiated and mobile-initiated procedures. The sequence of operation involves:

MN attaches to the access network with access specific authentication procedures;

During handover preparation stage, MN discovers the candidate authenticators;

Depending upon the reachability of the media independent authenticator, MN performs either direct or indirect proactive authentication using RP1 interface;

Once media independent authentication is successfully performed, the media specific keys are either pushed to or pulled from MSA-KH. Interface MIA-KH-MSA-KH is used to perform this operation;

MN executes the handover by performing the media specific secure association (e.g., 4-way handshake for 802.11) and attaches to one of the candidate networks known as target network; and After connection establishment, MN reregisters with the PoS.

Following assumptions are made throughout the rest of this section:

Assumptions

Authenticator is a MIH PoS;

MIH protocol is used for carrying EAP and ERP;

MIHF-ID of MN is used as the media-independent identity of the MN;

MIHF-ID of authenticator is used as the media-independent identity of the authenticator;

Media Independent Authenticator holds MSK (Master Session Key) or rMSK (Re-authentication MSK) generated by EAP;

MSK or rMSK is used for deriving media-independent pair-wise master key (MI-PMK); and When MN hands over to the target MSA-KH and it has a media-specific PMK (MS-PMK) derived from an MI-PMK for the target MSA-KH, it runs media-specific secure association using the MS-PMK.

Proactive Authentication Using EAP

This section describes the procedures using EAP as proactive authentication protocol.

Direct Proactive Authentication

In this scenario, MN directly performs the authentication with the media independent candidate authenticator. The assumption here is that MN either knows the candidate authenticator or discovers through MIH Information Service. Candidate authenticator must be reachable directly from the MN via an IP link.

Call Flows

Figure 9:
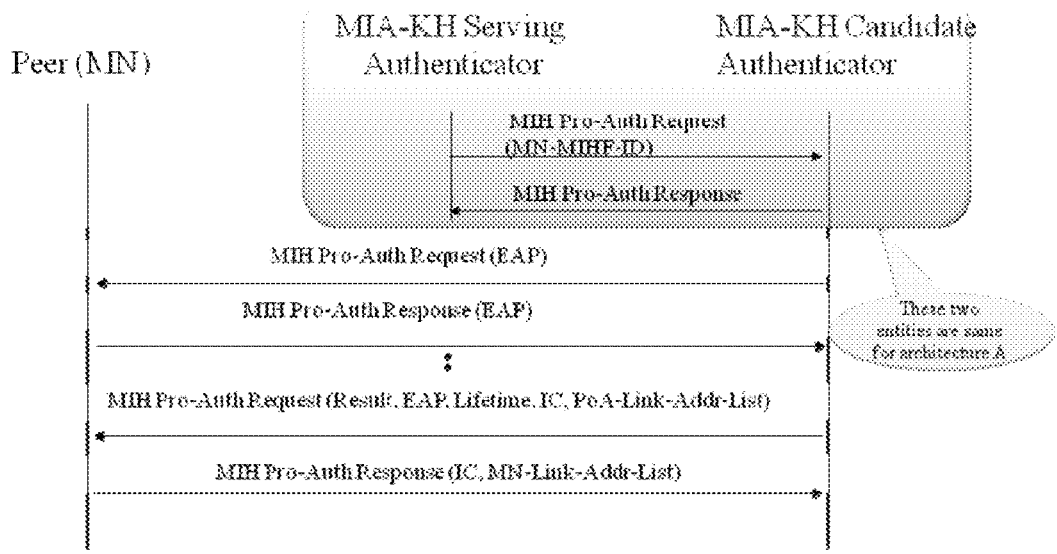
FIG. 9 shows the message flows between MN and Media independent authenticator for network initiated direct proactive authentication (EAP)

FIG. 9 describes the message flows between MN and Media independent authenticator for network initiated direct proactive authentication. It covers both example A and example B architectures. For example B architecture, Serving MIA-KH and candidate MIA-KH authenticators are two separate entities and they use interface RP5 to communicate each other. Two new MIH message types: i) MIH_Pro_Auth Request (EAP) message and ii) MIH Pro_Auth Response message are proposed for carrying EAP messages over MIH. The first MIH_Pro_Auth request message is initiated by the network that carries the EAP_Identity_Request message which is followed by a MIH_Pro_Auth Response message from the MN. The PoA-Link-Addr-List and MN-Link-Addr-list are necessary in the final request/response message in order for securely binding the keys with the link layer identities.

Figure 10:
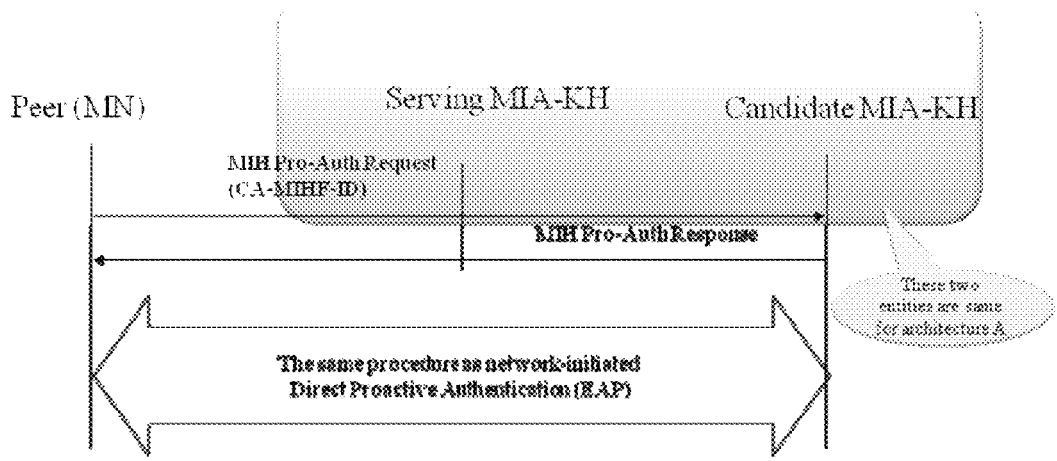
FIG. 10 shows the message flows between MN and Media independent authenticator for mobile initiated direct proactive authentication (EAP)

FIG. 10 describes the message flows between MN and Media independent authenticator for mobile initiated proactive authentication. The important difference from the previous one is that the trigger comes from the MN that generates the MIH_Pro_Auth Request and sends it to the candidate authenticator directly. The remaining call flows are similar to network initiated direct proactive authentication as described in FIG. 9.

Indirect Proactive Authentication

In this scenario, MN cannot perform the authentication directly with the media independent candidate authenticator. The serving authenticator takes part in forwarding the messages either to the MN (in case of network initiated authentication) or candidate MIA-KH (in case of mobile initiated authentication). The assumption here is that MN either knows the candidate authenticator or discovers through MIH Information Service but MN cannot reach to the candidate authenticator directly via an IP link.

Call Flows

Figure 11:
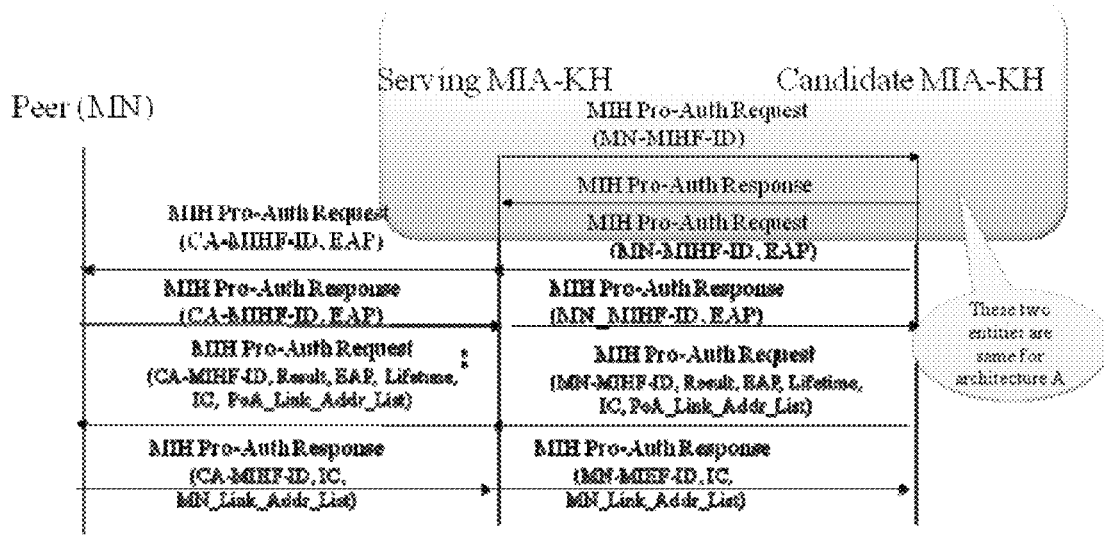
FIG. 11 shows the message flows between MN and Media independent authenticator for network initiated indirect proactive authentication (EAP)

FIG. 11 describes the message flows between MN and Media independent authenticators for network initiated indirect proactive authentication. As described earlier, it covers both example A and example B architectures and for example B architecture, Serving MIA-KH and candidate MIA-KH entities are two separate entities and they use interface RP5 to communicate each other. The first MIH_Pro_Auth request message is initiated by the candidate MIA-KH and sent it to serving MIA-KH which is then forwarded to the MN.

MN generates MIH_Pro_Auth Response message and subsequent EAP messages are carried over request and response messages. The PoA-Link-Addr-List and MN-Link-Addr-list are used for securely binding the key with the link layer identities.

Figure 12:
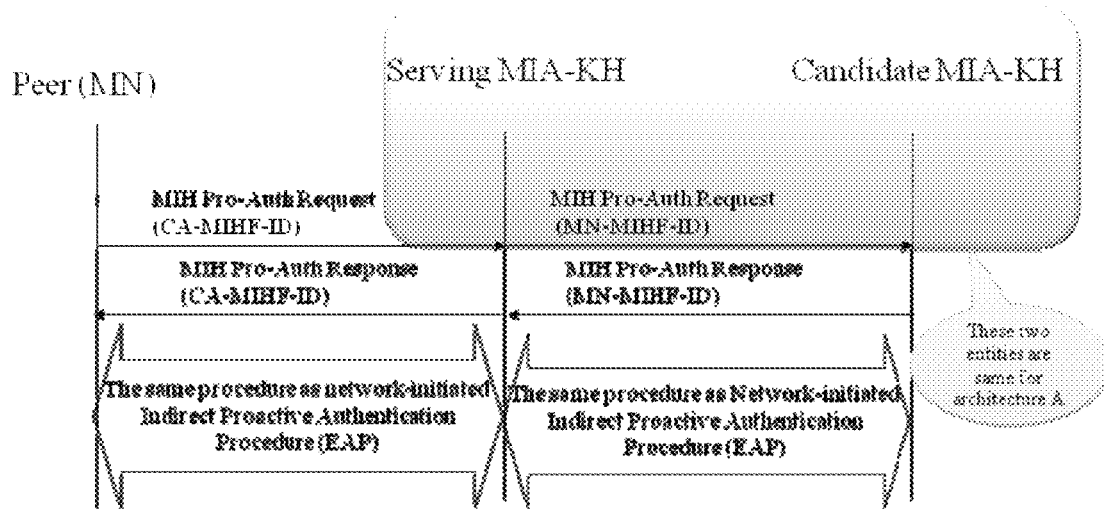
FIG. 12 shows the message flows between MN and Media independent authenticator for mobile initiated indirect proactive authentication (EAP)

FIG. 12 depicts the mobile initiated indirect proactive authentication in which trigger comes from the MN that generates the MIH_Pro_Auth Request message and sends it to the serving MIA-KH. Candidate MIA-KH receives this message from serving MIA-KH and sends the MIH_Pro_Auth Response message to the serving MIA-KH which is then forwarded to the MN. The remaining call flows are similar to network initiated indirect proactive authentication as described in FIG. 11.

Proactive Authentication Using ERP

This section describes the procedures using ERP as proactive authentication protocol.

Direct Proactive Authentication

In this scenario, MN directly performs the authentication with the media independent candidate authenticator. The assumption here is that MN either knows the candidate authenticator or discovers through MIH Information Service. Candidate authenticator must be reachable directly from the MN via an IP link.

Call Flows

Figure 13:
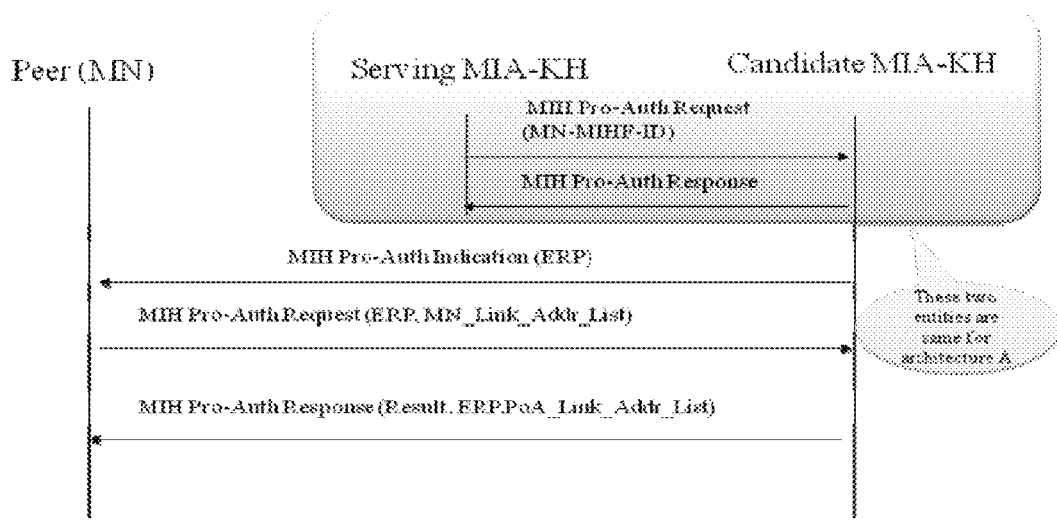
FIG. 13 shows the message flows between MN and Media independent authenticator for network initiated direct proactive authentication (ERP)

FIG. 13 illustrates the message flows between MN and Media independent authenticator for network initiated direct proactive authentication. It covers both example A and example B architectures and for example B architecture, Serving MIA-KH and candidate MIA-KH authenticators are two separate entities and they use interface RP5 to communicate each other. A new MIH message type called MIH_Pro_Auth Indication is proposed for initiating ERP messages exchanges over MIH. This triggers the MN to generate the MIH_Pro_Auth request (ERP) message. The PoA-Link-Addr-List and MN-Link-Addr-list are necessary in the request/response message in order for securely binding the keys with the link layer identities.

Figure 14:
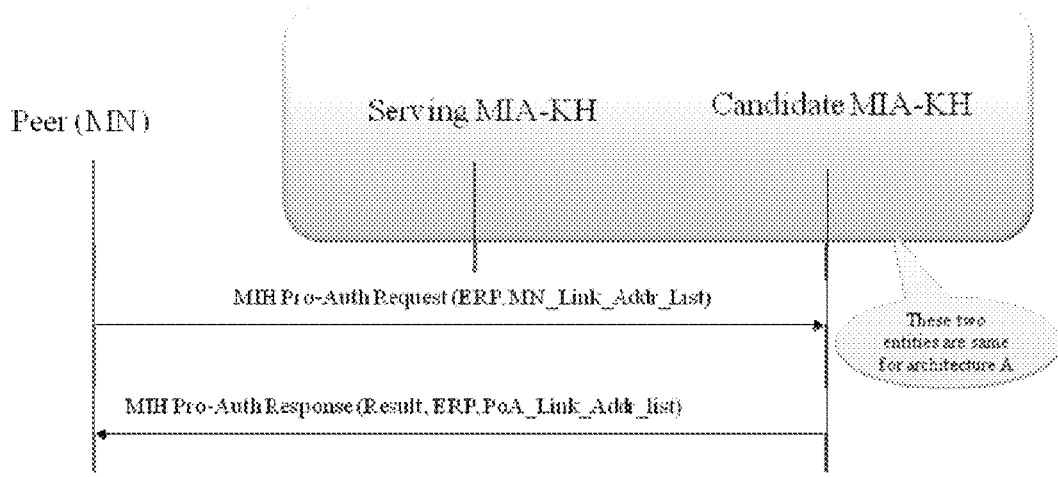
FIG. 14 shows the message flows between MN and Media independent authenticator for mobile initiated direct proactive authentication (ERP)

FIG. 14 illustrates the message flows between MN and Media independent authenticator for mobile initiated proactive authentication. The main difference from the previous one is that the trigger comes from the MN that generates the MIH_Pro_Auth Request and sends it to the candidate authenticator directly. Finally candidate MIA-KH sends the MIH_Pro_Auth Response with the authentication success or failure.

Indirect Proactive Authentication

In this scenario, MN cannot perform the authentication directly with the media independent candidate authenticator. The serving authenticator takes part in forwarding the messages either to the MN (in case of network initiated authentication) or candidate MIA-KH (in case of mobile initiated authentication). The assumption here is that MN either knows the candidate authenticator or discovers through MIH Information Service but MN cannot reach to the candidate authenticator directly via an IP link.

Call Flows

Figure 15:
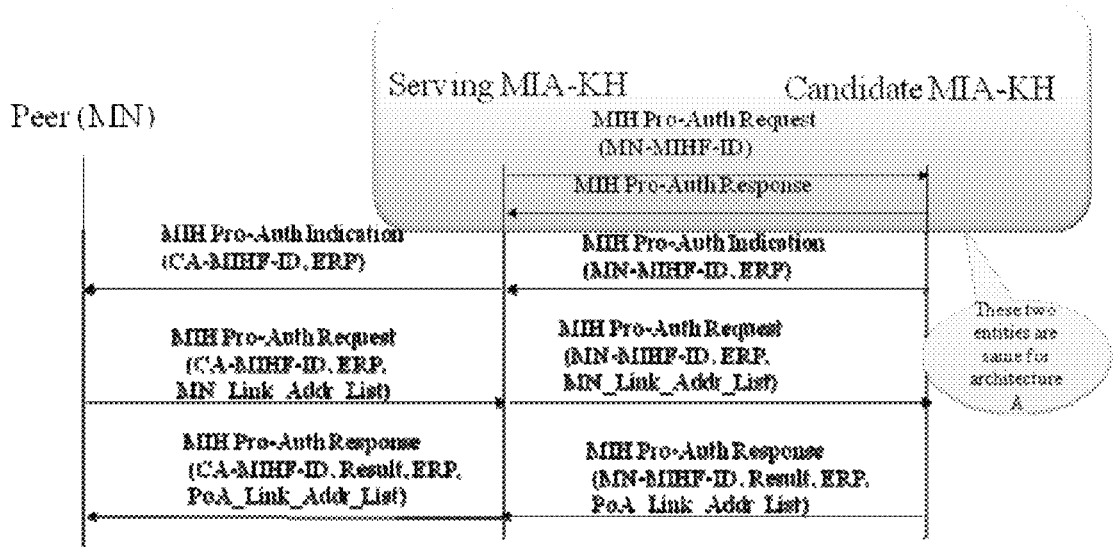
FIG. 15 shows the message flows between MN and Media independent authenticator for network initiated indirect proactive authentication (ERP)

FIG. 15 illustrates the message flows between MN and Media independent authenticators for network initiated indirect proactive authentication. The first MIH_Pro_Auth request message is initiated by the candidate MIA-KH and sent it to serving MIA-KH which is then forwarded to the MN. MN generates MIH_Pro_Auth Response message and subsequent EAP messages are carried over request and response messages. The PoA-Link-Addr-List and MN-Link-Addr-list are used for securely binding the key with the link layer identities.

Figure 16:
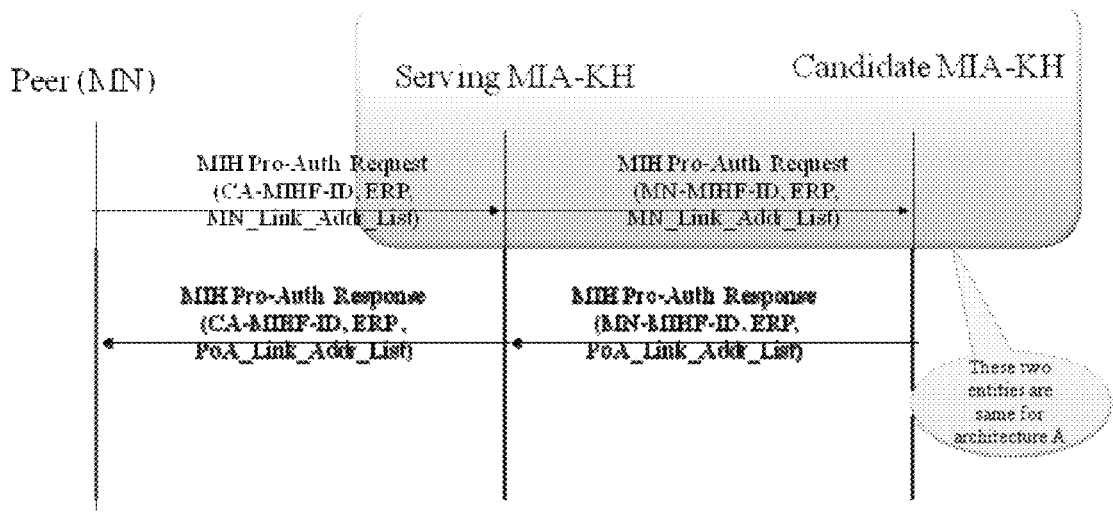
FIG. 16 shows the message flows between MN and Media independent authenticator for mobile initiated indirect proactive authentication (ERP)

FIG. 16 illustrates the mobile initiated indirect proactive authentication in which trigger comes from the MN that generates the MIH Pro_Auth Request message with ERP and sends it to the serving MIA-KH. Candidate MIA-KH receives this message from serving MIA-KH and sends the MIH_Pro_Auth Response message with ERP to the serving MIA-KH which is then forwarded to the MN. The PoA-Link-Addr-List and MN-Link-Addr-list are necessary in the request/response message for securely binding the keys with the link layer identities.

Attachment to Target Authenticator

After the authentication is performed and mobile node decides to execute the handover, it chooses one of the candidate networks and switch to that access network. This candidate network becomes the target network and the authenticator that serves this access network is called the target media specific authenticator and key holder (MSA-KH). Mobile node then performs the media specific secure association (SA) assuming that the target MSA has obtained the right set of keys from the target media independent authenticator and key holder (MIA-KH) for the mobile node.

Call Flows

Figure 17:
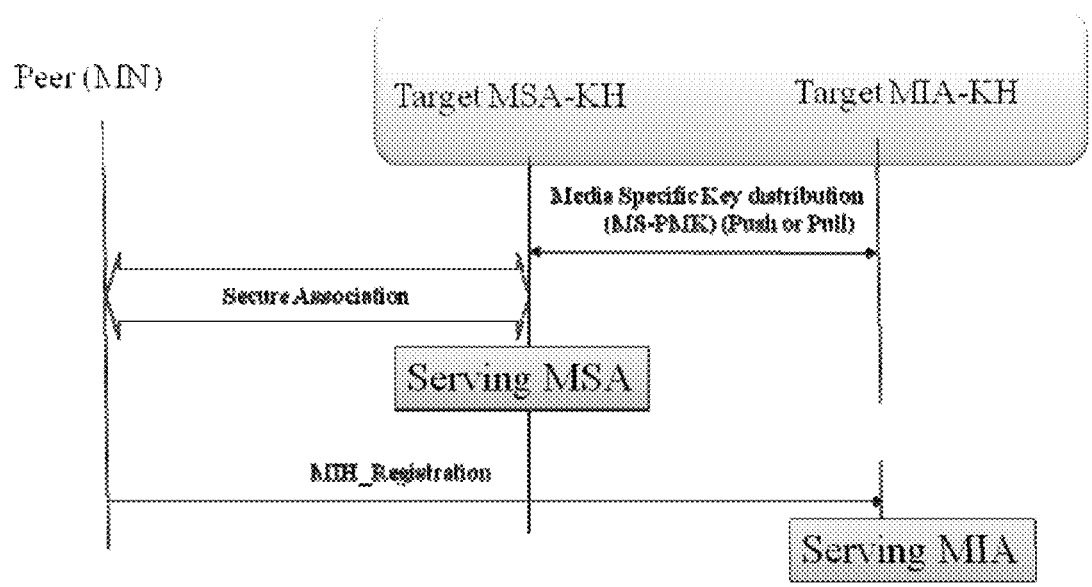
FIG. 17 shows the call flows between MN, target MSA-KH and target MIA-KH.

FIG. 17 depicts the call flows between MN, target MSA-KH and target MIA-KH. Once the proactive authentication is successfully performed, MIA-KH generates per mobile node media specific keys that can either be pushed to MSA-KH or pulled by the MSA-KH. Once the keys are available at the MSA-KH, mobile node can perform the media specific security association as soon as it switches to the network without needing to perform a full authentication. Once the secure association is successful and an IP connection is established, MN registers with the MIA-KH in order for the MIA-KH to correctly register the mobile node as its serving node.

Proactive Authentication Termination

The purpose of the proactive authentication termination is to ensure that mobile node and candidate/target/serving authenticator terminates the session and corresponding state machines are synchronized. At this point MI-PMK and MS-PMK are either cached or deleted.

Direct Proactive Authentication Termination

Direct proactive authentication termination allows both network and mobile node to directly terminate the authentication states.

Call Flows

Figure 18:
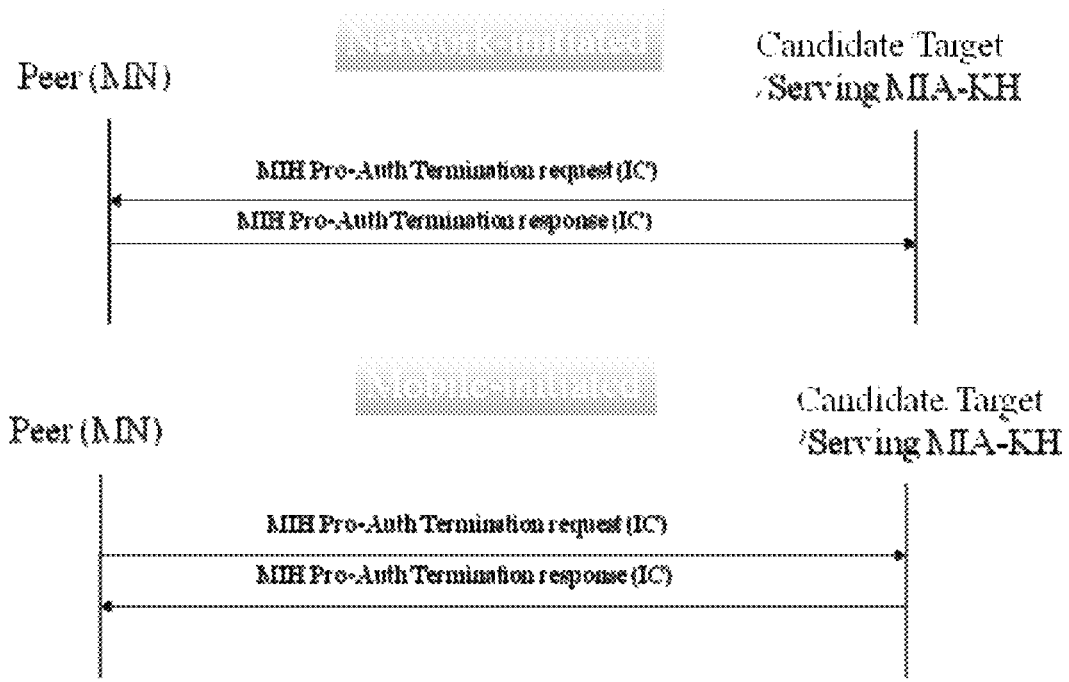
FIG. 18 shows the call flows for both network initiated and mobile initiated direct termination procedures.

FIG. 18 illustrates the call flows for both network initiated and mobile initiated termination procedures. The purpose of including the integrity check is to verify the authenticity of the termination request and response.

Indirect Proactive Authentication Termination

Indirect proactive authentication termination allows both network and mobile node to terminate the authentication states via the serving MIA-KH.

Call Flows

Figure 19:
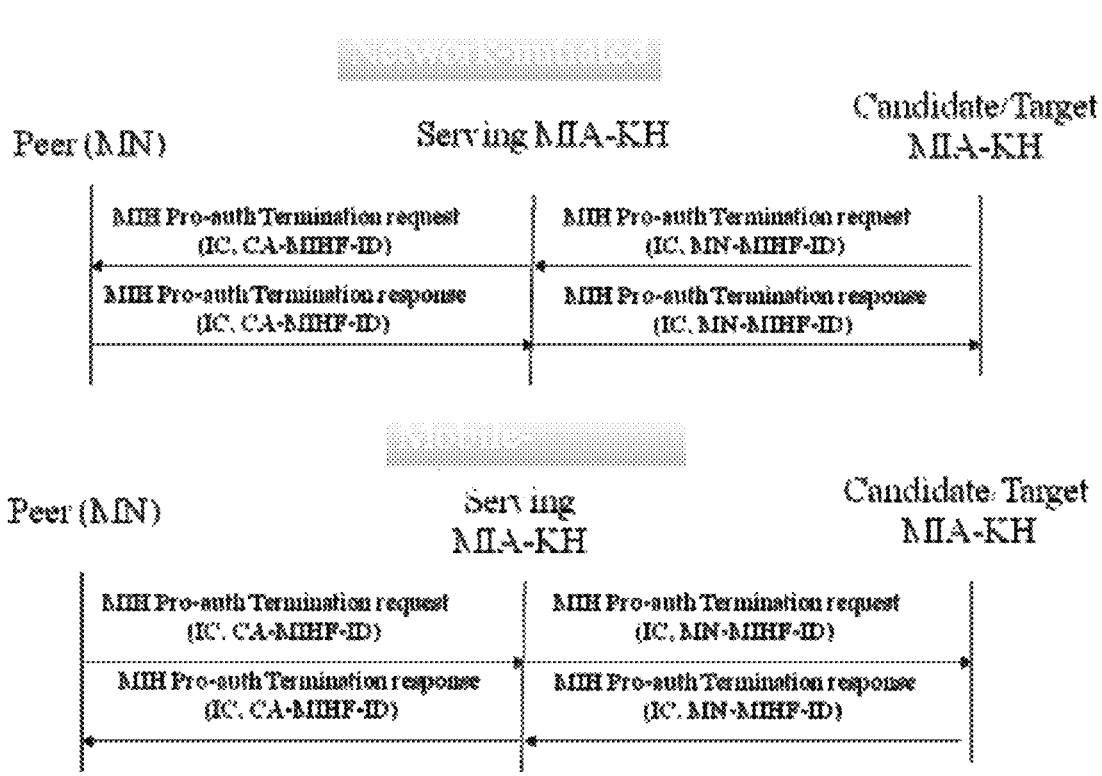
FIG. 19 shows the call flows for both network initiated and mobile initiated indirect termination procedures.

FIG. 19 illustrates the call flows for both network initiated and mobile initiated termination procedures. The purpose of including the integrity check is to verify the authenticity of the termination request and response. In both cases, serving MIA-KH forwards the termination request either to the MN or to the candidate MIA-KH.

Primitives

This section outlines the primitives and corresponding parameters that are required to enable the proactive authentication.

Event Primitives

Table 1 describes the list of link events.

TABLE 1

List of Event Primitives

| Link Events | Link event type | Description |
|---|---|---|
| Link_Pro_Auth_Key_Install | Local | This event indicates that a key distribution request for a MS-PMK has been generated by a media-specific access function. |

Link Pro_Auth_Key_Install.Indication

Function: this notification is delivered when a layer 2 connection establishment is attempted on the specified link interface Semantics of service primitive.

```
Link_Pro_Auth_key_Install.indication (
                                      LinkIdentifier
                                      )
```

Parameters:

| Name | Type | Description |
|---|---|---|
| Link Identifier | LINK_TUPLE_ID | Identifier of the link associated with the event. |

When Generated

This notification is generated when a layer 2 connection is established for the specified link interface or after the completion of a successful proactive authentication.

Effect of Receipt

The MIHF shall pass this link notification to the MIH User(s) that has subscribed for this notification. The MIH User(s) either push or pull the media specific keys.

MIH Events

Table 2 describes the list of MIH events

TABLE 2

List of MIH Events

| MIH Events | MIH event type | Description |
|---|---|---|
| MIH_Pro_Auth_Result | Local | Success or failure of proactive authentication (EAP or ERP) |

MIH_Pro_Auth_Result.Indication

Function: the MIH_Pro_Auth Result is sent to local MIHF users to notify them of a local event, or is the result of the receipt of an MIH_Pro_Auth Request message to indicate to the remote MIHF users, who have subscribed to this remote event.

Semantics of Service Primitive

```
MIH_Pro_Auth_Result.indication (
                                SourceIdentifier
                                MobilenodeIdentifier
                                CandidateIdentifier(Optional)
                                MobileLinkIdentifiers
                                PoALinkIdentifiers
                                Status
                                )
```

Parameters:

| Name | Type | Description |
|---|---|---|
| Source Identifier | MIHF_ID | This identifies the invoker of this primitive which can be either the local MIHF or a remote MIHF. |
| Mobile Node Identifier | MIHF_ID | This identifies a mobile node MIHF that will be the destination of this request. |
| Candidate Identifier (optional) | MIHF_ID | This identifies a remote MIHF that will be the future destination. |
| Mobile Link Identifiers | LIST(LINK_ID) | Link identifiers of MN. |
| PoA Link Identifiers | LIST(LINK_ID) | Link identifiers of PoA. |
| Status | STATUS | Status of (Success or failure) of proactive authentication |

When Generated

This primitive is generated by the local or remote MIHF when an MIH_Pro_Auth request message is received.

Effect on Receipt

The MIHF shall pass this link notification to the MIH User(s) that has subscribed for this notification.

Command Primitives

Table 3 describes the MIH commands.

TABLE 3

List of MIH Commands

| MIH Commands | MIH Command type | Description |
|---|---|---|
| MIH_Pro_Auth_Start | Remote | Starting Proactive authentication |

TABLE 3-continued

List of MIH Commands

| MIH Commands | MIH Command type | Description |
| --- | --- | --- |
| MIH_Pro_Auth_Termination | Remote | Terminating proactive authentication |
| MIH_Pro_Auth_key_Install | Local | Installing proactive authentication keys |

MIH_Pro_Auth_Start.Request

Function: The primitive is invoked by an MIH User to indicate to a local MIHF or a peer MIH User about its intent of proactive authentication.

Semantics of Service Primitive

```
MIH_Pro_Auth_Start.request      (
        DestinationIdentifier,
        MobileNodeIdentifier(Optional)
        CandidateIdentifier(Optional)
        )
```

Parameters:

| Name | Type | Description |
| --- | --- | --- |
| Destination Identifier | MIHF_ID | This identifies a remote MIHF that will be the destination of this request. |
| Mobile Node Identifier (Optional) | MIHF_ID | This identifies a mobile node MIHF that will be the destination of this request. |
| Candidate Identifier (Optional) | MIHF_ID | This identifies a remote MIHF that will be the future destination. |

When Generated

This primitive is invoked by an MIH User to communicate with a local MIHF or remote MIH User about its intent of proactive authentication.

Effect on Receipt

Upon receipt of this primitive, the local MIHF generates and sends an MIH_Pro_Auth request message to the remote MIHF identified by the Destination Identifier. The remote MIHF forwards the request as an indication to the MIH User.

MIH_Pro_Auth_Start.Indication

Function: this primitive is used by an MIHF to indicate to an MIH User that an MIH_Pro_Auth request message was received from a remote MIHF.

Semantics of Service Primitive

```
MIH_Pro_Auth_Start.indication (
        SourceIdentifier,
          MobileNodeIdentifier
        CandidateIdentifier
        )
```

Parameters:

| Name | Type | Description |
| --- | --- | --- |
| Source Identifier | MIHF_ID | This identifies the invoker of this primitive which can be either the local MIHF or a remote MIHF. |
| Mobile Node Identifier (Optional) | MIHF_ID | This identifies a mobile node MIHF that will be the destination of this request. |
| Candidate Identifier (Optional) | MIHF_ID | This identifies a remote MIHF that will be the future destination. |

When Generated

This primitive is generated by an MIHF on receiving an MIH_Pro_Auth request message from a peer MIHF.

Effect on Receipt

An MIH User receiving this indication shall invoke an MIH_Pro_Auth_Start.response primitive towards the remote MIHF indicated by the Source Identifier in the request message.

MIH_Pro_Auth_Start.Response

Function: This primitive is used by the MIHF on an MN to respond to an MIH_Pro_Auth request message from a remote MIHF in the network.

Semantics of Service Primitive

```
MIH_Pro_Auth_start.response (
        DestinationIdentifier,
        MobileNodeIdentifier      (Optional),
        CandidateIdentifier       (optional),
        Status,
        )
```

Parameters:

| Name | Type | Description |
| --- | --- | --- |
| Destination Identifier | MIHF_ID | This identifies a remote MIHF that will be the destination of this request. |
| Mobile Node Identifier | MIHF_ID | This identifies a mobile node MIHF that will be the destination of this request. |
| Candidate Identifier | MIHF_ID | This identifies a remote MIHF that will be the future destination. |
| Status | STATUS | Status of (Success or failure) of proactive authentication |

When Generated

The remote MIH User invokes this primitive in response to an MIH_Pro_Auth_Start.indication from its MIHF.

Effect on Receipt

The MIHF sends an MIH_Pro_Auth response message to the peer MIHF as indicated in the Destination Identifier.

MIH_Pro_Auth_Start.Confirm

Function: This primitive is used by the MIHF to confirm that an MIH_Pro_Auth response message was received from a peer MIHF.

Semantics of Service Primitive

```
MIH_Pro_Auth_Start.confirm                (
        SourceIdentifier,
        MobileNodeIdentifier(Optional),
        CandidateIdentifier(Optional),
        Status,
        )
```

Parameters:

| Name | Type | Description |
| --- | --- | --- |
| Source Identifier | MIHF_ID | This identifies the invoker of this primitive which can be either the local MIHF or a remote MIHF. |
| Mobile Node Identifier (Optional) | MIHF_ID | This identifies a mobile node MIHF that will be the destination of this request. |
| Candidate Identifier (Optional) | MIHF_ID | This identifies a remote MIHF that will be the future destination. |
| Status | STATUS | Status of (Success or failure) of proactive authentication |

When Generated

This primitive is generated by the MIHF on receiving an MIH_Pro_Auth response message from a peer MIHF.

Effect on Receipt

On receiving the primitive the entity that originally initiated the proactive authentication request decides to carry out the proactive authentication or abort it based on the primitive. However, if Status does not indicate "Success or Failure", the recipient ignores any other returned values and, instead, performs appropriate error handling.

MIH_Pro_Auth_Termination.Request

Function: The primitive is invoked by an MIH User to indicate to a peer MIH User about the termination of proactive authentication.

Semantics of Service Primitive

```
MIH_Pro_Auth_Termination.request    (
            DestinationIdentifier,
            MobileNodeIdentifier(Optional)
            CandidateIdnetifier(Optional)
            KeyCache
            )
```

Parameters:

| Name | Type | Description |
| --- | --- | --- |
| Destination Identifier | MIHF_ID | This identifies a remote MIHF that will be the destination of this request. |
| Mobile Node Identifier (Optional) | MIHF_ID | This identifies a mobile node MIHF that will be the destination of this request. |
| Candidate Identifier (Optional) | MIHF_ID | This identifies a remote MIHF that will be the future destination. |
| Key Cache | Boolean | This indicates if a key caching is requested or not:<br>True: key caching required;<br>False: key caching not required; |

When Generated

This primitive is invoked by an MIH User to communicate with a remote MIH User about the termination of proactive authentication.

Effect on Receipt

Upon receipt of this primitive, the local MIHF generates and sends an MIH_Pro_Auth_Termination request message to the remote MIHF identified by the Destination Identifier. The remote MIHF forwards the request as an indication to the MIH User.

MIH_Pro_Auth_Termination.Indication

Function: This primitive is used by an MIHF to indicate to an MIH User that an MIH_Pro_Auth_Termination request message was received from a remote MIHF.

Semantics of Service Primitive

```
MIH_Pro_Auth_Termination.indication (
            SourceIdentifier,
                MobileNodeIdentifier(Optional)
            CandidateIdnetifier(Optional)
                KeyCache
            )
```

Parameters:

| Name | Type | Description |
| --- | --- | --- |
| Source Identifier | MIHF_ID | This identifies the invoker of this primitive which can be either the local MIHF or a remote MIHF. |
| Mobile Node Identifier(Optional) | MIHF_ID | This identifies a mobile node MIHF that will be the destination of this request. |
| Candidate Identifier (Optional) | MIHF_ID | This identifies a remote MIHF that will be the future destination. |
| Key Cache | Boolean | This indicates if a key caching is requested or not:<br>True: key caching required;<br>False: key caching not required; |

When Generated

This primitive is generated by an MIHF on receiving an MIH_Pro_Auth_Termination request message from a peer MIHF.

Effect on Receipt

An MIH User receiving this indication shall generate a MIH_Pro_Auth_Termination.response towards the remote MIHF indicated by the Source Identifier in the request message.

MIH_Pro_Auth_Termination.Response

Function: this primitive is used by the MIHF on an MN to respond to an MIH_Pro_Auth request message from a remote MIHF in the network.

Semantics of Service Primitive

```
MIH_Pro_Auth_Termination.response    (
            DestinationIdentifier,
            MobileNodeIdentifier(optional),
            CandidateIdentifier(Optional),
            Status,
            )
```

Parameters:

| Name | Type | Description |
| --- | --- | --- |
| Destination Identifier | MIHF_ID | This identifies a remote MIHF that will be the destination of this request. |
| Mobile Node Identifier (Optional) | MIHF_ID | This identifies a mobile node MIHF that will be the destination of this request. |
| Candidate Identifier (Optional) | MIHF_ID | This identifies a remote MIHF that will be the future destination. |
| Status | STATUS | Status of (Success or failure) of proactive authentication |

When Generated

The remote MIH User invokes this primitive in response to an MIH_Pro_Auth_Termination.indication from its MIHF.

Effect on Receipt

The MIHF sends an MIH_Pro_Auth response message to the peer MIHF as indicated in the Destination Identifier.

MIH_Pro_Auth_Termination.Confirm

Function: This primitive is used by the MIHF to confirm that an

MIH_Pro_Termination response message was received from a peer MIHF.

Semantics of Service Primitive

```
MIH_Pro_Auth_Termination.confirm (
                SourceIdentifier,
                MobileNodeIdentifier(Optional),
                CandidateIdentifier(Optional),
                Status,
                )
```

Parameters:

| Name | Type | Description |
| --- | --- | --- |
| Source Identifier | MIHF_ID | This identifies the invoker of this primitive which can be either the local MIHF or a remote MIHF. |
| Mobile Node Identifier (Optional) | MIHF_ID | This identifies a mobile node MIHF that will be the destination of this request. |
| Candidate Identifier (Optional) | MIHF_ID | This identifies a remote MIHF that will be the future destination. |
| Status | STATUS | Status of (Success or failure) of proactive authentication |

When Generated

This primitive is generated by the MIHF on receiving an MIH_Pro_Auth response message from a peer MIHF.

Effect on Receipt

On receiving the primitive the entity that originally initiated the proactive authentication request decides to terminate the proactive authentication or abort it based on the primitive. However, if Status does not indicate "Success or Failure", the recipient ignores any other returned values and, instead, performs appropriate error handling.

LInk_Pro_Auth_Key_Install.Request

Function: The primitive is invoked by an MIH User to indicate a local MIHF to install the media specific keys to media specific authenticator.

Semantics of Service Primitive

```
Link_Pro_Auth_Key_Install.request (
                DestinationLinkIdentifierwithKeys
                )
```

Parameters:

| Name | Type | Description |
| --- | --- | --- |
| Destination Link Identifier with keys | LIST(SEQUENCE (LINK_TUPLE_ID, MS-PMK) | Identifier of the link(s) for which keys need to be installed and the media specific keys |

When Generated

This primitive is invoked by an MIHF to indicate a local layers to install the keys to media specific authenticator.

Effect on Receipt

Upon receipt of this primitive, the lower layer generates a Link_Pro_Auth_Key_Install.comfirm primitive to MIHF.

Link_Pro_Auth_Key_Install.Confirm

Function: This primitive is used by the MIHF to confirm that a Link_Pro_Auth_Key_Install.request was received.

Semantics of Service Primitive

```
Link_Pro_Auth_Key_Install.confirm (
                Status,
                )
```

Parameters:

| Name | Type | Description |
| --- | --- | --- |
| Status | STATUS | Status of key install request received |

When Generated

This primitive is generated by the lower layer on receiving an Link_Pro_Auth_Key_Install.request from MIHF.

Effect on Receipt

On receiving the primitive the MIHF decides to keep the proactive authentication states or abort it based on the status.

Key Generation Algorithm

KDF: Key derivation function specified in RFC 5246

The default KDF (i.e., IKEv2 PRF+ with based on HMAC-SHA-256) is used unless explicitly negotiated between peer MIHFs MI-PMK=KDF(MK, "MI-PMK"|RAND_P|RAND_A|length)

Length of MI-PMK is 64 octets

MK (Master Key): MSK or rMSK

RAND_P: A random number generated by peer

RAND_A: A random number generated by authenticator

MS-PMK=KDF(MI-PMK, "MS-PMK"|MN_LINK_ID|POA_LINK_ID|length)

Length of MS_PMK depends on each media. In the case of 802.11, Length=32.

MN_LINK_ID: Link identifier of MN, encoded as LINK_ID data type

POA_LINK_ID: Link identifier of media-specific authenticator, encoded as LINK_ID data type PRF+: PRF+key expansion specified in IKEv2 [RFC4306]
PRF+(K,S)=T1|T2|T3|T4| ...
Where:
'|' means concatenation
T1=PRF (K, S|0x01)
T2=PRF (K, T1 |S|0x02)
T3=PRF (K, T2 |S|0x03)
T4=PRF (K, T3 |S|0x04)
...

continuing as needed to compute the required length of key material. The default PRF is taken as HMAC-SHA-256 [SHA256]. Since PRF+ is only defined for 255 iterations it may produce up to 8160 octets of key material.

Key Distribution Mechanism

In some embodiments, a key distribution mechanism can be established by those in the art. For example, this can require a standard or can be left as deployment specific or implementation choice.

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. An apparatus having computer implemented media independent access functions, comprising:
    an independent authenticator, said independent authenticator to authenticate mobile devices attached between heterogeneous media;
    an interface to connect said independent authenticator to a plurality of heterogeneous access networks each of which supports a specific authenticator that corresponds to a specific serving media; and
    predefined media independent handover protocols and media independent handover identities based on the media independent functions on the computer,
    wherein said independent authenticator authenticates candidate access networks prior to the handover of the mobile devices from serving access networks to the candidate access networks each of which belonging to the plurality of heterogeneous access networks having the specific serving media.

2. The apparatus as set forth in claim 1, wherein:
media specific keys are pulled or pushed from the specific authenticator of a serving access network and a candidate access network via a specific interface provided between the independent authenticator and the specific authenticator, in which
said independent authenticator to hold master authentication keys to derive media independent pair-wise master authentication keys for handover.

3. The apparatus as set forth in claim 2, wherein:
the candidate access network and the mobile devices generate a point of attachment link address list and a mobile node link address list in a final request and response, respectively so as to securely bind the media specific keys with link layer identities.

4. The apparatus as set forth in claim 1, wherein:
each of the plurality of heterogeneous access networks is connected to a dedicated independent authenticator via the interface; and
a separate interface to form a bilateral communication connection between the dedicated independent authenticator of each of the plurality of heterogeneous access networks,
wherein each of the plurality of heterogeneous access networks with the dedicated independent authenticator having two separate point of services.

5. The apparatus as set forth in claim 1, wherein:
said independent authenticator being a single point of service for managing bilateral communication among each of the plurality of heterogeneous access networks via the interface.

6. The apparatus as set forth in claim 1, wherein:
the mobile devices perform authentication with the independent authenticator of a corresponding candidate access network by going through a serving access network, to which the mobile devices are attached, prior to handover of the mobile devices to the corresponding candidate access network.

7. The apparatus as set forth in claim 4, wherein:
a trigger for the handover can be generated by the candidate access network or by the mobile devices.

8. The apparatus as set forth in claim 1, wherein:
the mobile devices directly perform authentication with the independent authenticator of a corresponding candidate access network prior to handover of the mobile devices to the corresponding candidate access network.

9. The apparatus as set forth in claim 8, wherein:
a trigger for the handover can be generated by the candidate access network followed by the response from the mobile devices or by the mobile devices followed by the response from the candidate network.

10. The apparatus as set forth in claim 1, wherein:
the serving media comprises cable, fiber, radio frequency and satellite.

11. An article of manufacture, comprising:
a non-transitory machine-accessible medium having instructions encoded thereon for enabling a processor to execute an operation for proactively authenticating mobile devices attached between heterogeneous media via media independent authenticator, comprising the steps of:
assigning media specific authentication procedures to mobile devices attached to a serving access network within a plurality of heterogeneous access networks;
providing information regarding candidate access networks by way of the media independent authenticator to mobile devices during a handover preparation stage;
performing a proactive authentication using a interface; and
executing, upon successfully performing said proactive authentication by way of the media independent authenticator, the handover to a candidate access network having the media specific authentication procedure.

12. An article of manufacture as set forth in claim 11, wherein:
pulling or pushing media specific keys from the serving access network and the candidate access network via a specific interface provided between the media independent authenticator and media specific authenticator, in which
said media independent authenticator holding master authentication keys for deriving media independent pair-wise master authentication keys for handover.

13. An article of manufacture as set forth in claim 12, wherein:
the mobile devices directly performing the proactive authentication with the media independent authenticator of the candidate access network prior to handover of the mobile devices to the candidate access network.

14. An article of manufacture as set forth in claim 13, wherein:
generating a trigger for the handover by the candidate access network is followed by the response from the mobile devices.

15. An article of manufacture as set forth in claim 14, wherein:
the candidate access network and the mobile devices generate a point of attachment link address list and a mobile node link address list in a final request and response respectively so as to securely bind the media specific keys with link layer identities.

16. An article of manufacture as set forth in claim 13, wherein:
generating a trigger for the handover by the mobile devices is followed by the response from the candidate access network.

17. An article of manufacture as set forth in claim 16, wherein:
the candidate access network and the mobile devices generate a point of attachment link address list and a mobile node link address list in a final request and response respectively so as to securely bind the media specific keys with link layer identities.

18. An article of manufacture as set forth in claim 11, wherein:
the mobile devices performing the proactive authentication with the media independent authenticator of the candidate access network by going through the serving access network, to which the mobile devices are attached, prior to handover of the mobile devices to the candidate access network.

19. An article of manufacture as set forth in claim 18, wherein:
pulling or pushing media specific keys from the serving access network and the candidate access network via a specific interface provided between the media independent authenticator and media specific authenticator,
generating a trigger for the handover by the candidate access network is followed by the response from the mobile devices, the candidate access network and the mobile devices generate a point of attachment link address list and a mobile node link address list in a final request and response respectively so as to securely bind the media specific keys with link layer identities; and
generating a trigger for the handover by the mobile devices is followed by the response from the candidate access network, the candidate access network and the mobile devices generate a point of attachment link address list and a mobile node link address list in a final request and response respectively so as to securely bind the media specific keys with link layer identities.

20. A system for proactively authenticating, comprising:
a server having media independent access functions including media independent authentication functions that authenticates other entities attached via an interface to an end of a link specific to a media;
a plurality of heterogeneous networks each having media specific access functions including authentication functions corresponding to the other entities attached via the interface to the end of the link specific to the media;
mobile devices connected to said plurality of heterogeneous networks, and
said server having predefined media independent handover protocols and media independent handover identities based on the media independent functions related to handover,
wherein said server authenticates candidate access networks prior to the handover of the mobile devices from serving access networks to the candidate access networks each of which belonging to the plurality of heterogeneous access networks having the link specific to the media.

* * * * *

UNITED STATES PATENT AND TRADEMARK OFFICE
CERTIFICATE OF CORRECTION

PATENT NO. : 8,505,076 B2
APPLICATION NO. : 12/772632
DATED : August 6, 2013
INVENTOR(S) : Das et al.

It is certified that error appears in the above-identified patent and that said Letters Patent is hereby corrected as shown below:

In the Drawings

Figure 2:
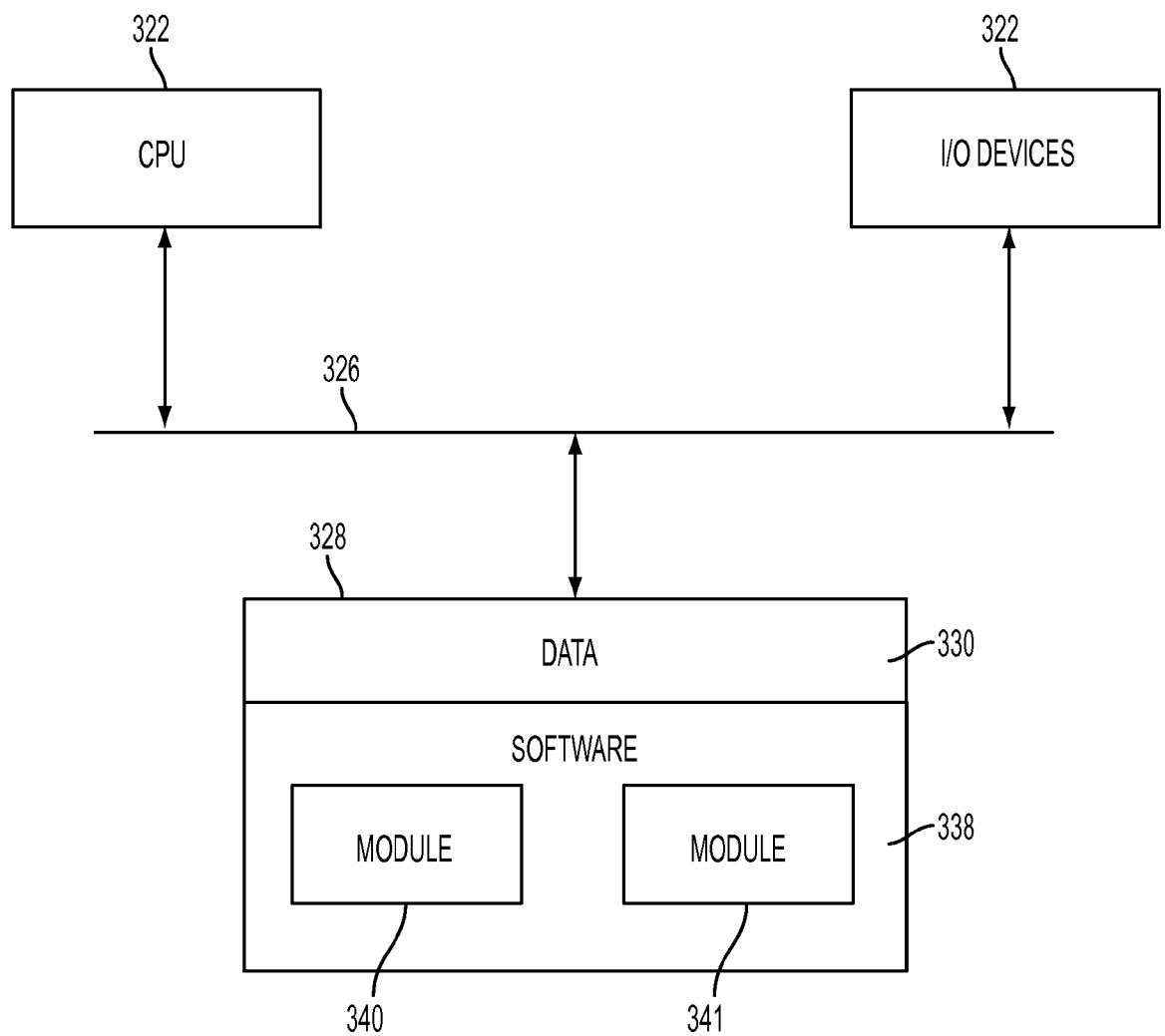
FIG. 2 shows an illustrative computer or control unit that can be used to implement computerized process steps, to be carried out by devices, such as, e.g., an access point, a user station, a source node or destination node in some embodiments.
Figure 3:
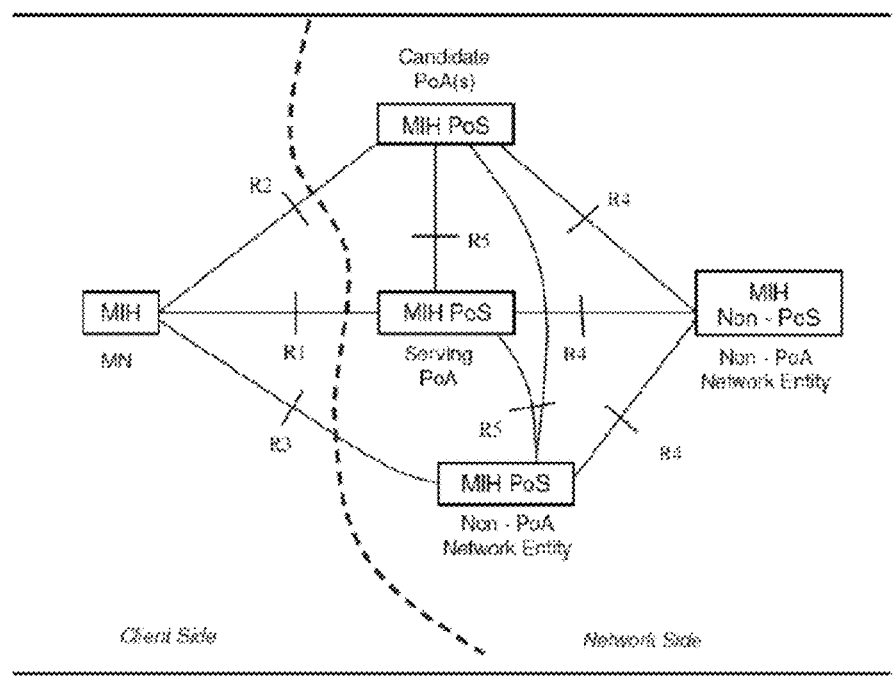
FIG. 3 is an illustrative media independent handover function communication model as disclosed in I.E.E.E. 802.21 standard on which authentication related security signaling can be implemented in some embodiments.
Figure 4:
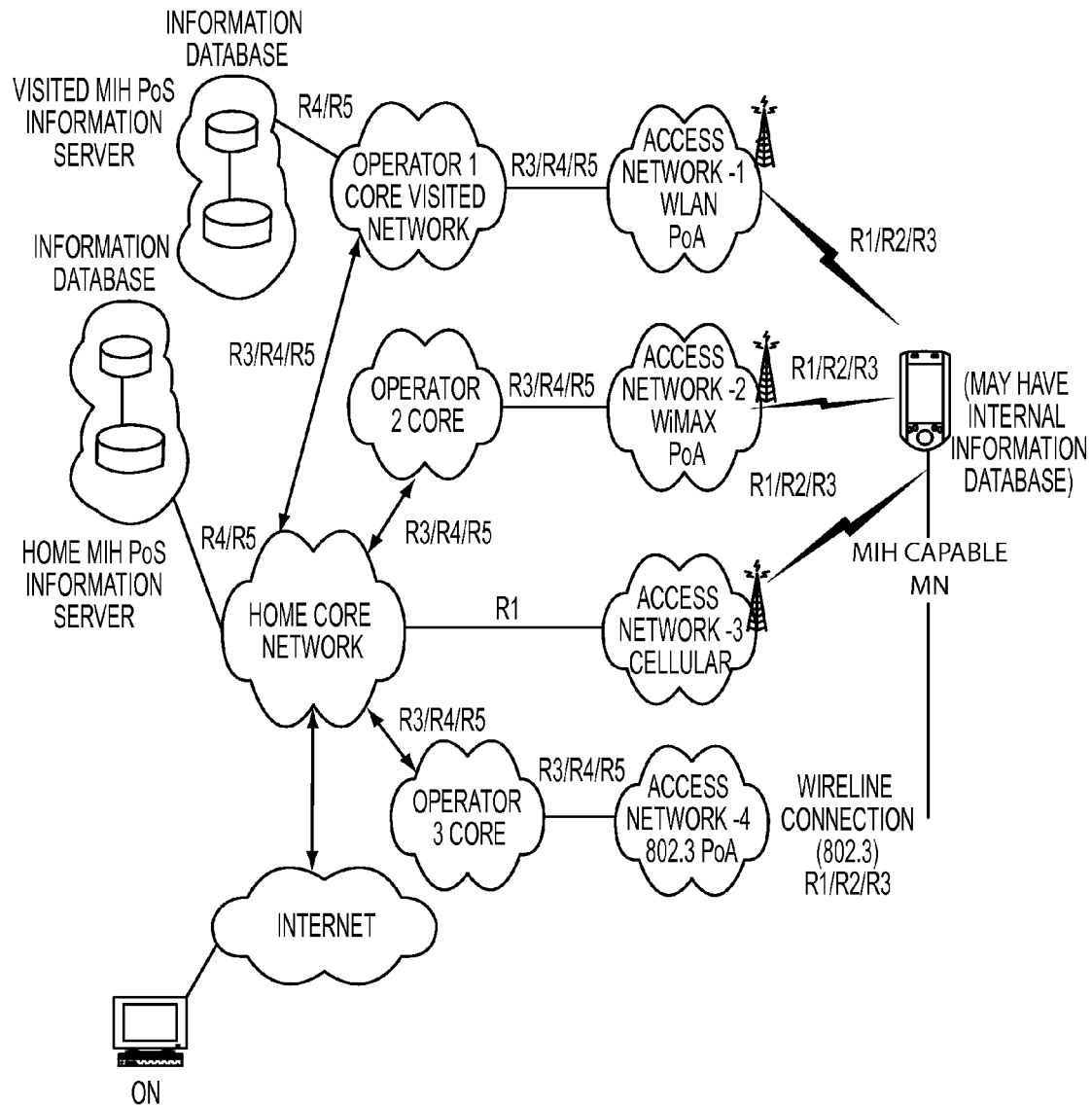
FIG. 4 is an example of network model with media independent handover services communication model on which authentication related security signaling can be implemented in some embodiments.

In Fig. 2, Sheet 2 of 14, delete " 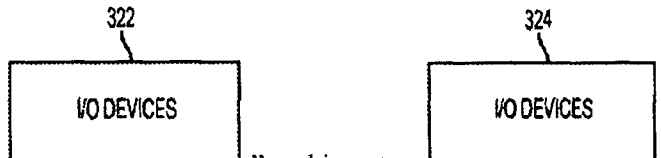 " and insert -- 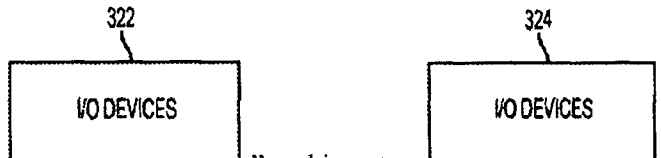 --, therefor.

In the Specification

In Column 12, Line 21, delete "wireline network 21," and insert -- wireline network 20, --, therefor.

In Column 12, Line 25, delete "stations 23, 25." and insert -- stations 23, 24. --, therefor.

In the Claims

In Column 31, Line 16, in Claim 12, delete "An article" and insert -- The article --, therefor.

In Column 31, Line 26, in Claim 13, delete "An article" and insert -- The article --, therefor.

In Column 31, Line 32, in Claim 14, delete "An article" and insert -- The article --, therefor.

In Column 31, Line 37, in Claim 15, delete "An article" and insert -- The article --, therefor.

In Column 31, Line 44, in Claim 16, delete "An article" and insert -- The article --, therefor.

In Column 31, Line 49, in Claim 17, delete "An article" and insert -- The article --, therefor.

In Column 32, Line 3, in Claim 18, delete "An article" and insert -- The article --, therefor.

In Column 32, Line 11, in Claim 19, delete "An article" and insert -- The article --, therefor.

Signed and Sealed this
Nineteenth Day of May, 2015

Michelle K. Lee
*Director of the United States Patent and Trademark Office*